(12) United States Patent
Shiobara et al.

(10) Patent No.: US 10,087,337 B2
(45) Date of Patent: Oct. 2, 2018

(54) OIL-BASED BALL-POINT PEN REFILL, OIL-BASED BALL-POINT PEN, AND OIL-BASED BALL-POINT PEN INK COMPOSITION

(71) Applicant: KABUSHIKI KAISHA PILOT CORPORATION, Tokyo-to (JP)

(72) Inventors: Akihiro Shiobara, Kanagawa-ken (JP); Kouichi Takayama, Kanagawa-ken (JP); Yasuyuki Sugimoto, Kanagawa-ken (JP); Susumu Yamaguchi, Kanagawa-ken (JP); Toshihide Kawasaki, Kanagawa-ken (JP); Hirotaka Masuda, Kanagawa-ken (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 124 days.

(21) Appl. No.: 14/910,012

(22) PCT Filed: Aug. 8, 2014

(86) PCT No.: PCT/JP2014/071051
§ 371 (c)(1),
(2) Date: Feb. 4, 2016

(87) PCT Pub. No.: WO2015/020203
PCT Pub. Date: Feb. 12, 2015

(65) Prior Publication Data
US 2016/0177114 A1    Jun. 23, 2016

(30) Foreign Application Priority Data

Aug. 8, 2013 (JP) .................. 2013-165123
Aug. 8, 2013 (JP) .................. 2013-165124
Mar. 31, 2014 (JP) .................. 2014-071061

(51) Int. Cl.
*C09D 11/18* (2006.01)
*B43K 7/02* (2006.01)
(Continued)

(52) U.S. Cl.
CPC ............... *C09D 11/18* (2013.01); *B43K 1/08* (2013.01); *B43K 7/02* (2013.01); *B43K 7/08* (2013.01);
(Continued)

(58) Field of Classification Search
CPC ........... C09D 11/18; B43K 7/00; B43K 7/005
See application file for complete search history.

(56) References Cited

U.S. PATENT DOCUMENTS 8,430,591 B1 * 4/2013 Okamoto ............. B43K 7/02
401/215
2003/0075074 A1   4/2003 Ichikawa et al.
(Continued)

FOREIGN PATENT DOCUMENTS

CN     1659246      8/2005
CN   201201428      3/2009
(Continued)

OTHER PUBLICATIONS

Chinese Office Action dated Mar. 10, 2017 issued in corresponding Chinese Patent Application No. 201480043891.7.
(Continued)

*Primary Examiner* — Jennifer C Chiang
*Assistant Examiner* — Bradley Oliver
(74) *Attorney, Agent, or Firm* — Wenderoth, Lind & Ponack, L.L.P.

(57) ABSTRACT

An oil-based ball-point pen refill includes a ball-point pen tip in which a ball is held, in which the ball-point pen tip is mounted on a leading end of an ink housing cylinder, an ink composition including a coloring agent consisting of a dye, an organic solvent, and polyvinyl butyral resin is housed in the ink housing cylinder, the arithmetic mean roughness of a surface of the ball is 0.1 to 15 nm, the content of the polyvinyl butyral resin is 50 mass % or more based on the
(Continued)

total mass of the whole resin, and an ink viscosity is 5000 to 50000 mPa·s. In an oil-based ball-point pen, the refill is disposed in a barrel cylinder. An oil-based ball-point pen ink composition including a specific salt-forming dye, polyvinyl butyral resin, and an aromatic alcohol can be utilized in the refill.

8 Claims, 1 Drawing Sheet

(51) Int. Cl.
    *B43K 1/08*     (2006.01)
    *B43K 7/08*     (2006.01)
    *B43K 24/02*     (2006.01)
    *C09D 11/106*     (2014.01)
    *C09D 11/17*     (2014.01)

(52) U.S. Cl.
    CPC ............ *B43K 24/02* (2013.01); *C09D 11/106* (2013.01); *C09D 11/17* (2013.01)

(56) References Cited

U.S. PATENT DOCUMENTS

| | | |
|---|---|---|
| 2004/0067092 A1 | 4/2004 | Maki et al. |
| 2005/0207824 A1 | 9/2005 | Ichikawa |
| 2006/0013641 A1 | 1/2006 | Morita et al. |
| 2009/0255439 A1* | 10/2009 | Ichikawa ................. B43K 7/00 106/31.61 |
| 2011/0218277 A1* | 9/2011 | Shah ...................... C09D 11/18 524/109 |
| 2011/0271870 A1 | 11/2011 | Otsubo et al. |

FOREIGN PATENT DOCUMENTS

| | | |
|---|---|---|
| JP | 6-313144 | 11/1994 |
| JP | 7-188601 | 7/1995 |
| JP | 8-157765 | 6/1996 |
| JP | 2002-205483 | 7/2002 |
| JP | 2003-41170 | 2/2003 |
| JP | 2003-191680 | 7/2003 |
| JP | 2004-137323 | 5/2004 |
| JP | 2007-153941 | 6/2007 |
| JP | 2012-246441 | 12/2012 |
| JP | 2013-28788 | 2/2013 |

OTHER PUBLICATIONS

Partial Supplementary European Search Report dated Feb. 20, 2017 issued in corresponding European Patent Application No. 14834835.2.

International Preliminary Report on Patentability dated Feb. 9, 2016 in International Application No. PCT/JP2014/071051.

International Search Report dated Oct. 28, 2014 in International Application No. PCT/JP2014/071051.

Extended European Search Report dated Mar. 23, 2017 issued in corresponding European Patent Application No. 14834835.2.

* cited by examiner

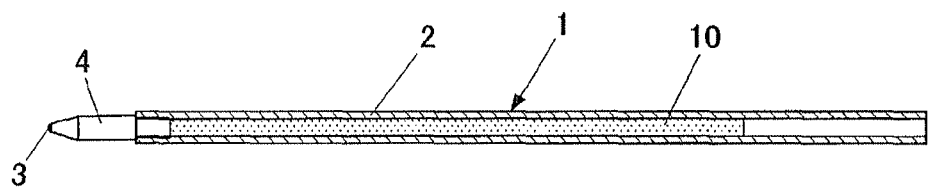
F I G. 1
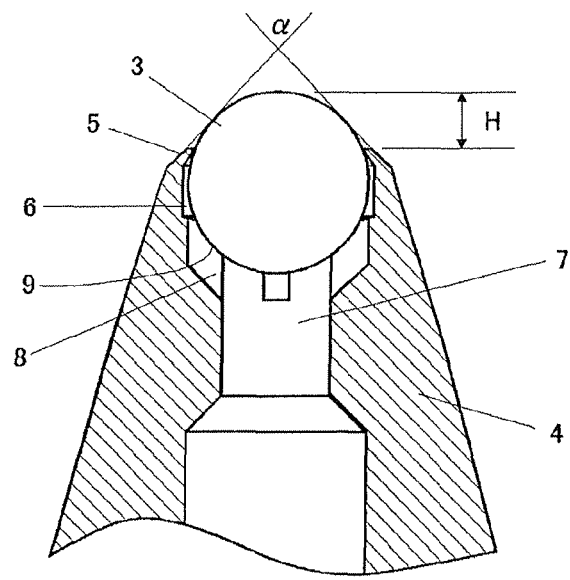
F I G. 2

OIL-BASED BALL-POINT PEN REFILL, OIL-BASED BALL-POINT PEN, AND OIL-BASED BALL-POINT PEN INK COMPOSITION

TECHNICAL FIELD

The present invention relates to an oil-based ball-point pen refill, an oil-based ball-point pen, and an oil-based ball-point pen ink composition.

BACKGROUND ART

As oil-based ball-point pen ink compositions, oil-based ball-point pen ink compositions using various dyes such as nigrosine dyes have been conventionally proposed for offering deep written traces, in Japanese Patent Laid-Open No. 7-188601 "OIL-BASED BALL POINT PEN INK COMPOSITION", Japanese Patent Laid-Open No. 8-157765 "OIL-BASE INK COMPOSITION FOR BALL-POINT", and the like.

Further, Japanese Patent Laid-Open No. 6-313144 "OIL-BASE BALL-POINT PEN" discloses an oil-based ball-point pen that is allowed to have an ink viscosity of 100 mPa·S or less at a shear rate of 400 s$^{-1}$ and an ink viscosity of 1000 mPa·S or more at a shear rate of 5 s$^{-1}$ to offer a favorable feeling of writing.

CITATION LIST

Patent Literature

Patent Literature 1: Japanese Patent Laid-Open No. 7-188601
Patent Literature 2: Japanese Patent Laid-Open No. 8-157765
Patent Literature 3: Japanese Patent Laid-Open No. 6-313144

SUMMARY OF INVENTION

Technical Problem

In the invention disclosed in Patent Literatures 1 or 2, a written trace can be deepened to some extent by using a nigrosine dye as a coloring agent. However, an increase in the content of the nigrosine dye is required for offering a sufficiently deep written trace. In such a case, there have been points to be improved in that, e.g., an ink viscosity is increased, thereby showing the tendency of a poor feeling of writing, and, in addition, the solubility of the dye in an organic solvent used is insufficient.

There have also been points to be improved in that, e.g., when an ink viscosity decreases, leakage of ink (dripping of ink) from a gap between a ball and a leading tip end occurs, and a ball seat is prone to be worn. For solving such problems, there is also a conceivable method of imparting a shear-thinning viscosity to an ink by adding a shear-thinning viscosity-imparting agent that increases an ink viscosity during rest and decreases the ink viscosity during writing, as disclosed in Patent Literature 3. However, in this case, there have been cases in which ink following properties, compatibility between the shear-thinning viscosity-imparting agent and another ink component, and the like may be insufficient.

Further, as a corresponding method in a tip structure, ink dripping can be inhibited by always pressing a ball on the inner wall surface of a tip by a coil spring and/or the like in a tip body to close a minute gap between the ball and a leading tip end. However, the method has also had points to be improved in that, e.g., a manufacture cost soars, rotation of the ball is prone to be poor, and a feeling of writing is also adversely affected.

An object of the present invention is to provide an oil-based ball-point pen refill that can offer a deep written trace, has favorable performance against ink dripping, and is excellent in a feeling of writing, an oil-based ball-point pen using the oil-based ball-point pen refill, and an ink composition that is preferably used in the oil-based ball-point pen refill and the oil-based ball-point pen.

Solution to Problem

In order to solve the above-described problems, the present invention is to provide:

"an oil-based ball-point pen refill, comprising a ball-point pen tip in which a ball is rotatably held, wherein the ball-point pen tip is mounted directly or via a tip holder on a leading end of an ink housing cylinder, an oil-based ball-point pen ink composition comprising a coloring agent, an organic solvent, and resin is housed in the ink housing cylinder, an arithmetic mean roughness of a surface of the ball is 0.1 to 15 nm, the coloring agent consists of a dye, the oil-based ball-point pen ink composition comprises polyvinyl butyral resin as the resin, a content of the polyvinyl butyral resin is 50 mass % or more based on a total mass of the whole resin in the oil-based ball-point pen ink composition, and an ink viscosity at 20° C. and a shear rate of 5 sec$^{-1}$ is 5000 to 50000 mPa·s";

"an oil-based ball-point pen, wherein the oil-based ball-point pen refill is disposed in a barrel cylinder"; and "an oil-based ball-point pen ink composition, comprising a salt-forming dye of an azo skeleton acid dye and a triarylmethane skeleton basic dye, polyvinyl butyral resin, and an aromatic alcohol".

Advantageous Effects of Invention

In accordance with the present invention, there are provided: an oil-based ball-point pen refill that can offer a deep written trace, has favorable performance against ink dripping, and is excellent in a feeling of writing; and an oil-based ball-point pen using the oil-based ball-point pen refill. In addition, in accordance with the present invention, there is provided an oil-based ball-point pen ink composition that can be applied to the refill or the ball-point pen. The oil-based ball-point pen ink composition has favorable performance against ink dripping and also has favorable ink stability over time because a resin coating film covering a gap between a ball and a leading tip end is formed in the leading tip end. Furthermore, an ink layer always having elasticity can be formed between the ball and a ball seat, and the oil-based ball-point pen ink composition is thus excellent in a feeling of writing.

BRIEF DESCRIPTION OF DRAWINGS

FIG. 1 is a vertical cross-sectional view of a ball-point pen refill according to the present invention.

FIG. 2 is a vertical cross-sectional view of an enlarged principal portion in which part of a ball-point pen refill according to the present invention is omitted.

DESCRIPTION OF EMBODIMENTS

A first aspect of the present invention is an oil-based ball-point pen refill, comprising a ball-point pen tip in which a ball is rotatably held, wherein the ball-point pen tip is mounted directly or via a tip holder on a leading end of an ink housing cylinder, an oil-based ball-point pen ink composition comprising a coloring agent, an organic solvent, and resin is housed in the ink housing cylinder, an arithmetic mean roughness of a surface of the ball is 0.1 to 15 nm, the coloring agent consists of a dye, the oil-based ball-point pen ink composition comprises polyvinyl butyral resin as the resin, a content of the polyvinyl butyral resin is 50 mass % or more based on a total mass of the whole resin in the ink composition, and an ink viscosity at 20° C. and a shear rate of 5 sec$^{-1}$ is 5000 to 50000 mPa·s.

As described above, it is conceivable that in order to offer a deep written trace, the concentration of a dye in an ink composition is enhanced, and much ink is ejected to a paper surface during writing, i.e., the amount of consumed ink is increased. However, the increased concentration of the dye tends to result in deterioration in stability over time, and the simply increased amount of consumed ink is prone to result in poor performance against ink dripping and tends to result in blobbing. In view of such tendencies, the present invention is to solve the problems by using specific resin.

(Oil-Based Ball-Point Pen Ink Composition)

An oil-based ball-point pen ink composition according to the present invention comprises a coloring agent, an organic solvent, and resin.

(Coloring Agent)

The coloring agent used in the present invention is a dye. Of coloring agents, use of the dye can result in a deep, fresh written trace. In contrast, in the case of using a pigment, selection of a pigment dispersing agent, and the like are needed for obtaining the sufficient dispersion stability of the pigment, and a disadvantage in cost competitiveness is caused. As the dye, an oil soluble dye, an acid dye, a basic dye, a gold-containing dye, a direct dye, or the like, or each of various salt-formation-type dyes thereof, or the like can be adopted.

Examples of salt-forming dyes include salt-forming dyes of basic dyes and acid dyes, salt-forming dyes of basic dyes and organic acids, and salt-forming dyes of acid dyes and organic amines. A salt-forming dye of a basic dye and an acid dye is preferred because the salt-forming dye in a small amount can offer a deep written trace. It is most preferable to use only the salt-forming dye of a basic dye and an acid dye because use of the salt-forming dye in combination with another kind of dye may adversely affect ink stability over time and a feeling of writing. Examples of basic dyes included in salt-forming dyes include a basic dye having a xanthene skeleton, a triarylmethane skeleton, an azomethine skeleton, an azo skeleton, an anthraquinone skeleton, an oxazine skeleton, or the like, and examples of acid dyes included in salt-forming dyes include an acid dye having a triarylmethane skeleton, an azo skeleton, an anthraquinone skeleton, an oxazine skeleton, or the like.

Especially, because dissolution stability and stability over time in oil-based ink can be improved when an oil-based ball-point pen ink composition contains polyvinyl butyral resin as in the present invention, it is preferable that the oil-based ball-point pen ink composition contains a salt-forming dye of an azo skeleton acid dye and a triarylmethane skeleton basic dye. The salt-forming dye is also preferred because the salt-forming dye has a high ionic bonding strength between dyes and high stability in oil-based ink, and the salt-forming dye is also preferred because a small amount of ink composition can offer a deep written trace.

It is necessary only that the azo skeleton acid dye is an acid dye having an azo group (—N=N—) in the molecule. Examples of the azo skeleton acid dye include a monoazo skeleton acid dye and a diazo skeleton acid dye. The azo skeleton acid dye is preferred because of having an azo group (—N=N—) in the molecule, thereby being more difficult to separate than the other acid dyes, to stabilize the salt-forming dye. Further, the diazo skeleton acid dye is more preferred because of having two azo groups (—N=N—) in the molecule, thus having two double bonds, and being more difficult to separate than the monoazo skeleton acid dye, to stabilize the salt-forming dye. Furthermore, an azo skeleton acid dye having an aromatic ring is preferred because lubricity can be improved. Specific examples of diazo skeleton acid dyes include C.I. Acid Red 97, 111, 114, or 115, or C.I. Acid Yellow 38, 42, or 44; and specific examples of monoazo skeleton acid dyes include C.I. Acid Yellow 11, 17, 25, 29, 36, or 76, or C.I. Acid Red 1, 6, 8, 9, 13, 14, or 18. Of these, it is preferable to use C.I. Acid Red 97, 111, 114, or 115 because ink stability over time can be improved.

The triarylmethane skeleton basic dye is a basic dye having three aromatic rings such as phenyl group and naphthyl group on the same carbon atom, and specific examples thereof include C.I. Basic Blue 1, 5, 7, 19, or 26, C.I. Basic Violet 1, 3, 4, 10, or 15, or C.I. Basic Green 1, 4, or 7. Of these, C.I. Basic Violet 1, 3, 4, 10, or 15 is preferred because stability is high in the case of forming a salt-forming dye of it and an azo skeleton acid dye. Furthermore, C.I. Basic Violet 4 is preferred because of having a structure containing no Michler's ketone, of having no possibility of carcinogenicity, and of therefore having high safety. Furthermore, the case of using C.I. Basic Violet 4 as a triarylmethane skeleton basic dye is preferred because a salt-forming dye in which C.I. Acid Red 97 is combined as an azo skeleton acid dye has high stability.

Specific examples of salt-forming dyes include VALIFAST BLACK 1802, VALIFAST BLACK 1805, VALIFAST BLACK 1807, VALIFAST VIOLET 1701, VALIFAST VIOLET 1704, VALIFAST VIOLET 1705, VALIFAST BLUE 1601, VALIFAST BLUE 1605, VALIFAST BLUE 1613, VALIFAST BLUE 1621, VALIFAST BLUE 1631, VALIFAST RED 1320, VALIFAST RED 1360, VALIFAST RED 1380, VALIFAST YELLOW 1101, and VALIFAST YELLOW 1151 (manufactured by ORIENT CHEMICAL INDUSTRIES CO., LTD.); Aizen Spilon Black GMH-Special, Aizen Spilon Violet C-RH, Aizen Spilon Blue GNH, Aizen Spilon Blue 2BNH, Aizen Spilon Blue C-RH, Aizen Spilon Red C-GH, Aizen Spilon Red C-PH, Aizen Spilon Red C-BH, Aizen Spilon Yellow C-GNH, Aizen Spilon Yellow C-2GH, S.P.T. Blue 111, S.P.T. Blue GLSH-Special, S.P.T. Red 533, S.P.T. Orange 6, S.B.N. Violet 510, S.B.N. Yellow 510, S.B.N. Yellow 530, and S.R.C-BH (manufactured by Hodogaya Chemical Co., Ltd.); and the like.

The content of the dye is preferably 5.0 to 30.0 mass % with respect to the total mass of the ink composition. A deep written trace tends to be difficult to offer when the content is less than 5.0 mass %, while solubility in ink tends to be easily influenced when the content is more than 30.0 mass %. The content of the dye is more preferably 7.0 to 25.0 mass % and still more preferably 10.0 to 20.0 mass % with respect to the total mass of the ink composition.

(Organic Solvent)

The organic solvent that can be used in the present invention is not particularly limited. As the organic solvent, a solvent commonly used in an oil-based ball-point pen ink can be used. Of organic solvents, an alcohol-based organic solvent is preferable. Examples of the alcohol-based organic solvent include diethylene glycol, triethylene glycol, polyethylene glycol, propylene glycol, dipropylene glycol, butylene glycol, ethylene glycol, benzyl alcohol, phenylethyl alcohol, methylphenylcarbinol, phthalyl alcohol, methanol, ethanol, 1-propanol, 2-propanol, isopropanol, isobutanol, t-butanol, propargyl alcohol, allyl alcohol, 3-methyl-1-butyn-3-ol, and other alcohol-based solvents such as ethylene glycol monomethyl ether acetate. The alcohol-based organic solvent is preferred because of easily volatilizing, easily drying on a leading tip end, enhancing ease of formation of a resin coating film, and enhancing ease of improvement in performance against ink dripping. In the present invention, the alcohol-based organic solvent refers to an alcohol-based organic solvent having no ether bond.

Of the alcohol-based solvents, an aromatic alcohol-based solvent is preferable. The reason that the aromatic alcohol-based solvent is preferable is because the solubility of polyvinyl butyral resin and a salt-forming dye of an azo skeleton acid dye and a triarylmethane skeleton basic dye is improved, and ink stability over time can be improved without separating the resin and the salt-forming dye from each other.

Examples of organic solvents other than the alcohol-based organic solvents include a glycol ether-based solvent. Such a glycol ether-based solvent is preferred because the solubility of polyvinyl butyral resin therein is improved to thereby enhancing ease of obtainment of the effect of forming the resin coating film of the polyvinyl butyral resin on a leading tip end and to offer favorable performance against ink dripping. An aromatic glycol ether-based solvent is more preferred because lubricity can be improved.

Furthermore, the aromatic glycol ether-based solvent is also preferred because ink dripping can be further inhibited by forming a uniform, thick resin coating film on the leading tip end to cover a gap between a ball and the leading tip end even in a state in which the leading tip end is exposed to atmosphere.

Examples of the glycol ether-based solvent include ethylene glycol monomethyl ether, ethylene glycol monoethyl ether, ethylene glycol monobutyl ether, ethylene glycol dimethyl ether, ethylene glycol monophenyl ether, propylene glycol monomethyl ether, propylene glycol monoethyl ether, diethylene glycol dimethyl ether, 3-methoxybutanol, and 3-methoxy-3-methylbutanol.

One or more kinds of these organic solvents may be used. For example, it is preferable to use a glycol ether-based solvent and an alcohol-based solvent in combination. Further, either the glycol ether-based solvent or the alcohol-based solvent preferably has an aromatic group. In particular, it is preferable to use the glycol ether-based solvent having an aromatic group and the alcohol-based solvent having an aromatic group in combination because lubricity can be improved.

With regard to the contents of the organic solvents, a too high content of alcohol-based organic solvent allows writing performance during drying up to be easily influenced, while a too high content of glycol ether-based organic solvent results in absorption of too much moisture, whereby a resin coating film is softened to easily influence performance against ink dripping and ink stability over time. Thus, in consideration of a balance between the writing performance during drying up and the ink stability over time, $1 \leq A/B \leq 10$ is preferably satisfied, and $1 \leq A/B \leq 5$ is more preferably satisfied on the assumption that the content of the alcohol-based solvent is A and the content of the glycol ether-based solvent is B.

Further, the content of the organic solvent is preferably 10.0 to 70.0 mass % with respect to the total mass of the ink composition because, e.g., solubility and a property of drying a written trace can be improved, and bleeding can be prevented. Further, when a glycol ether-based organic solvent is used as the organic solvent, the content of the glycol ether-based organic solvent is preferably 10.0 to 50.0 mass % and more preferably 10.0 to 30.0 mass % with respect to the total mass of the organic solvent, for improving the stability of dissolution of the polyvinyl butyral resin therein. Further, when an alcohol-based solvent is used as the organic solvent, the content of the alcohol-based solvent is preferably 30.0 to 90.0 mass % and more preferably 50.0 to 90.0 mass % with respect to the total mass of the organic solvent, for improving a drying property in a leading tip end.

(Resin)

Examples of the resin used in the oil-based ball-point pen ink composition include polyvinyl butyral resin, polyacetal resin, polyvinyl alcohol resin, cellulosic resin, polyvinyl pyrrolidone resin, ketone resin, terpene resin, alkyd resin, phenoxy resin, and polyvinyl acetate resin. A feature of the present invention is use of at least polyvinyl butyral resin. Polyvinyl butyral is formed by allowing polyvinyl alcohol (PVA) to react with butyl aldehyde (BA), and commonly has a butyral group, an acetyl group, and a hydroxyl group in its structure.

Further, polyvinyl butyral resin preferably has a hydroxyl group content of 25 mol % or more. This is because the polyvinyl butyral resin having a hydroxyl group content of 25 mol % or more allows a thick resin coating film to be formed on a leading tip end to covering a gap between a ball and the leading tip end, thereby significantly offering the effect of inhibiting ink dripping, in a state in which the leading tip end is exposed to atmosphere. In contrast, polyvinyl butyral resin having a hydroxyl group content of less than 25 mol has insufficient solubility in an organic solvent, easily allows a resin coating film to be nonuniform, and precludes the sufficient effect of inhibiting ink dripping. Polyvinyl butyral resin of which the hydroxyl group content is 30 mol % or more is preferred because of enhancing ease of improvement in the feeling of writing of a ball-point pen. Generation of frictional heat by rotation of a ball during writing tends to allow ink on a leading tip end to be warmed, thereby increasing the temperature of the ink and decreasing the viscosity of the ink; however, the ink composition using the polyvinyl butyral resin has the property of inhibiting the viscosity from being decreased even when the temperature is increased. As a result, an ink layer always having elasticity is formed between the ball and a ball seat, to preclude direct contact, thereby improving a feeling of writing. Such an effect is preferred particularly in an oil-based ball-point pen with which writing is often performed at high writing pressure. Because use of polyvinyl butyral resin of which the hydroxyl group content is more than 40 mol % results in enhancement of ease of increase in the amount of absorbed moisture, thereby easily influencing stability over time with an oil-based ink component, polyvinyl butyral resin having a hydroxyl group content of 40 mol % or less is preferred. Thus, polyvinyl butyral resin having a hydroxyl group content of 30 to 40 mol % is preferred, and a hydroxyl group content of 30 to 36 mol % is still more preferred.

The hydroxyl group content (mol %) of the polyvinyl butyral resin refers to the content of hydroxyl group (mol %) with respect to the total molar quantity of butyral group (mol %), acetyl group (mol %), and the hydroxyl group (mol %).

With regard to the mean degree of polymerization of polyvinyl butyral resin, a feeling of writing tends to be easily improved when the mean degree of polymerization is 200 or more. The reason thereof is because performance against ink dripping is improved, the cohesion of ink can be enhanced, ink easily adheres to the surface of a ball, and the ink remains on the surface of the ball even after writing, to enhance ease of entrance of the ink between the ball and a ball seat, thereby inhibiting the ball from coming in direct contact with the ball seat. On the other hand, the mean degree of polymerization is preferably 200 to 2500 and more preferably 800 to 2500 because the viscosity of ink tends to be excessively increased, thereby influencing a feeling of writing, when the mean degree of polymerization is more than 2500. A case in which the mean degree of polymerization is 800 or more is preferred because it is easy to maintain a written trace with high relief in the case of transferring ink to a paper surface due to easy to form uniform ink layer, and it is easy to offer the deep written trace. For a more favorable feeling of writing, the mean degree of polymerization is preferably 2000 or less. Thus, the mean degree of polymerization is preferably 800 to 2000, and the mean degree of polymerization is most preferably 1200 to 2000 because performance against ink dripping tends to be easily improved when the mean degree of polymerization is 1200 or more.

The mean degree of polymerization herein refers to the number of base units composing one molecule of polyvinyl butyral resin, and a value measured based on a method described in JIS K6728 (2001) can be adopted.

Specific examples of polyvinyl butyral resin include trade names: S-LEC BH-3 (hydroxyl group content: 34 mol %, and mean degree of polymerization: 1700), BH-6 (hydroxyl group content: 30 mol %, and mean degree of polymerization: 1300), BX-1 (hydroxyl group content: 33±3 mol %, and mean degree of polymerization: 1700), BX-5 (hydroxyl group content: 33±3 mol %, and mean degree of polymerization: 2400), BM-1 (hydroxyl group content: 34 mol %, and mean degree of polymerization: 650), BM-2 (hydroxyl group content: 31 mol %, and mean degree of polymerization: 800), BM-5 (hydroxyl group content: 34 mol %, and mean degree of polymerization: 850), BL-1 (hydroxyl group content: 36 mol %, and mean degree of polymerization: 300), BL-1H (hydroxyl group content: 30 mol %), BL-2 (hydroxyl group content: 36 mol %, and mean degree of polymerization: 450), BL-2H (hydroxyl group content: 29 mol %), BL-10 (hydroxyl group content: 28 mol %), and the like, manufactured by SEKISUI CHEMICAL CO., LTD., and trade names: MOWITAL B20H (hydroxyl group content: 26 to 31 mol %, and mean degree of polymerization: 250 to 500), 30T (hydroxyl group content: 33 to 38 mol %, and mean degree of polymerization: 400 to 650), 30H (hydroxyl group content: 26 to 31 mol %, and mean degree of polymerization: 400 to 650), 30HH (hydroxyl group content: 30 to 34 mol %, and mean degree of polymerization: 400 to 650), 45H (hydroxyl group content: 26 to 31 mol %, and mean degree of polymerization: 600 to 850), 60T (hydroxyl group content: 34 to 38 mol %, and mean degree of polymerization: 750 to 1000), 60H (hydroxyl group content: 26 to 31 mol %, and mean degree of polymerization: 750 to 1000), 75H (hydroxyl group content: 26 to 31 mol %, and mean degree of polymerization: 1500 to 1750), and the like, manufactured by KURARAY CO., LTD. These may be used singly or in mixture of two or more kinds thereof.

Further, the content of polyvinyl butyral resin is preferably 50 mass % or more based on the total mass of the whole resins. This is because when the content of the polyvinyl butyral resin is less than 50 mass % based on the total mass of the whole resins, a resin coating film is inhibited from being formed on a leading tip end due to the other resins, it is impossible to sufficiently suppress ink dripping, a resin film having elasticity is further inhibited from being formed, and it is difficult to offer the effect of improving a feeling of writing. For improving performance against ink dripping and the feeling of writing, the content of the polyvinyl butyral resin is more preferably 70 mass % or more, still more preferably 90 mass % or more further in consideration of such a tendency, based on the total mass of the whole resins.

This is considered to be because the high content of the polyvinyl butyral resin in the oil-based ball-point pen ink composition enhances ease of adhesion of ink to a surface of a ball, thereby enabling a favorable feeling of writing and a deep written trace. More specifically, it is presumed that due to the synergistic effect with an ink viscosity of 5000 to 50000 mPa·s, the ink easily coheres on the ball surface and easily adheres to the ball surface, it is easy to maintain the ink on the ball surface even after writing, an ink layer is therefore formed between the ball and the ball seat, a favorable feeling of writing is offered, a written trace is also inhibited from bleeding during transfer to a paper surface, and the deep written trace is therefore offered.

Further, the content of the polyvinyl butyral resin is preferably 3.0 to 40.0 mass % with respect to the total mass of the ink composition because when the content of the polyvinyl butyral resin is less than 3.0 mass % with respect to the total mass of the ink composition, the content is possibly insufficient to form a resin coating film, and it is prone to offer poor performance against ink dripping, while when the content is more than 40.0 mass %, it is prone to offer poor solubility in ink. Furthermore, the content is preferably 10.0 mass % or more in consideration of performance against ink dripping, and ink viscosity tends to be excessively increased to influence a feeling of writing when the content is more than 30.0 mass %. Thus, the content is preferably 10.0 to 30.0 mass % and most preferably 12.0 to 25.0 mass %.

The resins other than the polyvinyl butyral resin may be appropriately used as an ink viscosity modifier, a stringiness-imparting resin, and the like. In particular, polyvinyl pyrrolidone resin is blended as a stringiness-imparting resin, thereby enhancing the binding property of ink and easily suppressing generation of surplus ink on a leading tip end, and therefore, the oil-based ball-point pen ink composition preferably contains polyvinyl pyrrolidone resin. The content of the polyvinyl pyrrolidone resin is preferably 0.01 to 3.0 mass % with respect to the total mass of the ink composition because the generation of the surplus ink tends to be difficult to suppress when the content is less than 0.01 mass % with respect to the total mass of the ink composition while solubility in ink tends to be prone to be poor when the content is more than 3.0 mass %. In more consideration of the above-described reasons, the content is preferably 0.1 to 2.0 mass %. Specific examples thereof include trade names: PVP K-15, PVP K-30, PVP K-90, PVP K-120, and the like, manufactured by ISP Japan Ltd. These may be used singly or in mixture of two or more kinds thereof.

When the stringiness-imparting resin is used, the content thereof is preferably 0.1 to 20.0 mass % based on the total mass of the whole resins in the oil-based ball-point pen composition. Generation of surplus ink (blobbing) can be suppressed by setting the content of the stringiness-imparting resin at 0.1 mass % or more based on the total mass of the whole resins, while the effect of polyvinyl butyral resin can be sufficiently exerted by setting the content at 20 mass % or less. Specifically, a resin coating film is not inhibited from being formed on a leading tip end, the resin coating film is therefore formed without any trouble, ink dripping is suppressed, an ink layer having elasticity can be further formed, and therefore, the effect of improving a feeling of writing can be offered. The content of the stringiness-imparting resin is preferably 1.0 to 20.0 mass % based on the total mass of the whole resins because surplus ink can be further suppressed. For further improving performance against ink dripping and a feeling of writing, the content is more preferably 1.0 to 10.0 mass % and still more preferably 2.0 to 7.0 mass %.

(Other Components)

For offering a favorable feeling of writing, it is preferable to use a surfactant, in particular, a phosphate ester-based surfactant in the oil-based ball-point pen ink composition. This is because in the phosphate ester-based surfactant, adsorption of a phosphate group on a metal surface easily occurs, lubricity is maintained between a ball and a tip body, and it is easy to further improve a feeling of writing. In particular, lubricity can be further improved by the synergistic effect of an effect due to an ink layer formed of the polyvinyl butyral resin and an effect due to the phosphate ester surfactant.

Examples of phosphate ester-based surfactants include phosphoric monoesters of polyoxyethylene alkyl ether or polyoxyethylene alkylaryl ether, phosphoric diesters of polyoxyethylene alkyl ether or polyoxyethylene alkylaryl ether, phosphoric triesters of polyoxyethylene alkyl ether or polyoxyethylene alkylaryl ether, alkyl phosphate esters, alkyl ether phosphate esters, or derivatives thereof, and examples of the alkyl group of the phosphate ester-based surfactant include styrenated phenol-based, nonylphenol-based, lauryl alcohol-based, tridecyl alcohol-based, and octyl phenol-based alkyl groups. These phosphate ester-based surfactants may be used singly or in mixture of two or more kinds thereof. Especially, the number of carbon atoms contained in the alkyl group is preferably 5 to 18 and more preferably 10 to 15. Further, the preferred number of carbon atoms contained in the alkyl group is 12 to 18 in consideration of ink stability over time. Because the excessively small number of carbon atoms in the alkyl group results in the tendency to reduce the effect of improving lubricity while the excessively large number of carbon atoms results in the tendency to easily influence ink stability over time, caution is needed. Furthermore, the phosphate ester-based surfactant tends to soften a formed coating film and may improve writing performance. Thus, unlike a cap-type writing instrument, in a retractable writing instrument such as a knock-type writing instrument or a rotation delivery-type writing instrument, a state in which a pen point is always exposed to the outside results in easy influence on writing performance, and therefore, it is more preferable to use the phosphate ester-based surfactant.

Further, the content of the phosphate ester-based surfactant is preferably 0.1 to 5.0 mass % with respect to the total mass of the ink composition. This is because a content of less than 0.1 mass % results in the tendency of difficulty in obtaining desired lubricity while a content of more than 5.0 mass % results in the tendency of easy deterioration in ink stability over time. The content of the phosphate ester-based surfactant is more preferably 0.3 to 3.0 mass % and still more preferably 0.5 to 3.0 mass % with respect to the total mass of the ink composition.

Specific examples of the phosphate ester-based surfactant include PLYSURF A217E (alkyl group: 14 carbon atoms, and acid value: 45 to 58), PLYSURF A219B (alkyl group: 12 carbon atoms, and acid value: 44 to 58), PLYSURF A215C (alkyl group: 12 carbon atoms, and acid value: 80 to 95), PLYSURF A208B (alkyl group: 12 carbon atoms, and acid value: 135 to 155), and PLYSURF A208N (alkyl group: mixture of 12 carbon atoms and 13 carbon atoms, and acid value: 160 to 185) in PLYSURF Series (DKS Co. Ltd.), and PHOSPHANOL RB410 (alkyl group: 18 carbon atoms, and acid value: 80 to 90), PHOSPHANOL RS-610 (alkyl group: 13 carbon atoms, and acid value: 75 to 90), and PHOSPHANOL RS-710 (alkyl group: 13 carbon atoms, and acid value: 55 to 75) in PHOSPHANOL Series (manufactured by TOHO CHEMICAL INDUSTRY Co., Ltd.). These surfactants may be used singly or in mixture of two or more kinds thereof.

An acid value is represented by mg of potassium hydroxide required for neutralizing an acidic component contained in 1 g of sample.

An organic amine is still more preferably used in the oil-based ball-point pen ink of the present invention for the purpose of neutralizing the phosphate ester-based surfactant and the like. Further, with regard to the reactivity of the organic amine with the other components in ink, it is preferable to use a secondary amine and/or a tertiary amine in consideration of ink stability over time because the reactivity of a primary amine is the highest, followed by the reactivity of the secondary amine, and the reactivity of the tertiary amine. These may be used singly or in mixture of two or more kinds thereof.

With regard to the organic amine used in the present invention, the total amine number of the organic amine is preferably in a range of 70 to 300 (mgKOH/g). This is because a case is prevented in which a total amine number of more than 300 results in high reactivity, and therefore, the organic amine reacts with the other components in ink, thereby deteriorating ink stability over time. Further, a total amine number of less than 70 results in insufficient neutralization of the phosphate ester-based surfactant, whereby ink stability over time is easily influenced, the absorptivity of a metal in a ball, a tip body, and the like further easily becomes poor, and a lubrication property tends to be deteriorated. For preventing the deterioration of the ink stability over time and the lubricity, the total amine number preferably ranges from 150 to 300 (mgKOH/g). When a salt-forming dye of alkylbenzene sulfonic acid and a triarylmethane-based basic dye is used as the coloring agent, a total amine number of 200 to 300 (mgKOH/g) is more preferred because the stability of the salt-forming dye and the organic amine is increased, and a total amine number of 230 to 270 (mgKOH/g) is still more preferred.

The total amine number shows the total amount of the primary, secondary, and tertiary amines, and is represented by mg of potassium hydroxide equivalent to hydrochloric acid required for neutralizing 1 g of sample.

Examples of organic amines include oxyethylene alkylamine, polyoxyethylene alkylamine, and alkylamines such as laurylamine, stearylamine, distearylamine, dimethyllaurylamine, dimethylstearylamine, and dimethyloctylamine. Of these, it is preferable to use oxyethylene alkylamine and polyoxyethylene alkylamine having ethylene oxide ($CH_2CH_2O$) because use of an organic amine having ethylene oxide ($CH_2CH_2O$) results in easier obtainment of a lubricating effect.

Specific examples of oxyethylene alkylamines and polyoxyethylene alkylamines include NYMEEN L-201 (total amine number: 232 to 246, and secondary amine), L-202 (total amine number: 192 to 212, and tertiary amine), L-207 (total amine number: 107 to 119, and tertiary amine), S-202 (total amine number: 152 to 166, and tertiary amine), S-204 (total amine number: 120 to 134, and tertiary amine), S-210 (total amine number: 75 to 85, and tertiary amine), and DT-208 (total amine number: 146 to 180, and tertiary amine) (manufactured by Nippon Oil & Fats Co., Ltd.). Specific examples of alkylamines include FARMIN 80 (total amine number: 204 to 210, and primary amine), FARMIN D86 (total amine number: 110 to 119, and secondary amine), FARMIN DM2098 (total amine number: 254 to 265, and tertiary amine), and FARMIN DM8680 (total amine number: 186 to 197, and tertiary amine) (Kao Corporation). These may be used singly or in mixture of two or more kinds thereof. For allowing lubricity and stability over time to be favorable, the content of the oxyethylene alkylamine and the polyoxyethylene alkylamine is preferably 0.1 to 10.0 mass % and more preferably 0.5 to 5.0 mass % with respect to the total mass of the ink composition.

For allowing lubricity and stability over time to be favorable, the content of the organic amine is preferably 0.1 to 10.0 mass % and more preferably 0.5 to 5.0 mass % with respect to the total mass of the ink composition.

Further, it is preferable to satisfy $0.1 \leq Y/X \leq 2.0$ on the assumption that the total amine number of the organic amine is X and the acid value of the phosphate ester-based surfactant is Y. This is because the case of $Y/X>2.0$ or $Y/X<0.10$ results in easy promotion of precipitation over time under the influence of the ions of a ball material or tip body comprising a metal, whereby poor writing is easily caused by precipitates. The total amine number X of the organic amine and the acid value Y of the phosphate ester-based surfactant more preferably satisfy $0.1 \leq Y/X \leq 1.0$, still more preferably satisfy $0.3 \leq Y/X \leq 1.0$, and especially preferably satisfy $0.3 \leq Y/X \leq 0.8$.

In the ink composition according to the present invention, (i) another surfactant, for example, a fluorine-based surfactant, a silicone-based surfactant, a fatty acid alkanolamide, an anionic surfactant, a cationic surfactant, an ampholytic surfactant, or a salt-forming body of an anionic surfactant and/or a cationic surfactant, (ii) a viscosity modifier, for example, a pseudoplasticity-imparting agent such as a fatty acid amide or a hydrogenated castor oil, (iii) a coloring agent stabilizer, (iv) a plasticizer, (v) a chelating agent, or (vi) water as a co-solvent may also be appropriately used as another additive in order to improve lubricity and ink stability over time. These may be used singly or in combination of two or more kinds thereof.

(Physical Properties of Oil-Based Ball-Point Pen Ink Composition)

Further, the ink viscosity of the oil-based ball-point pen ink composition of the present invention is preferably 5000 to 50000 mPa·s and more preferably 10000 to 50000 mPa·s because an ink viscosity of less than 5000 mPa·s at 20° C. and a shear rate of 5 $sec^{-1}$ results in difficulty in suppressing ink dripping while an ink viscosity of more than 50000 mPa·s at 20° C. and a shear rate of 5 $sec^{-1}$ results in the tendency to deteriorate a feeling of writing and to preclude a deep written trace. Further, in the present invention, polyvinyl butyral resin is used as a main resin, therefore, an ink layer is easily formed between a ball and a tip body, particularly between the ball and a ball seat as described above, a feeling of writing can be allowed to be favorable, and therefore, the ink viscosity is still more preferably 15000 to 35000 mPa·s and, in addition, most preferably 20000 to 30000 mPa·s in consideration of suppression of ink dripping, and the feeling of writing.

The ball-point pen refill according to the present invention has the effect of markedly improving performance against ink dripping, the need of a structure in which a ball is always pressed on the inner wall surface of a leading tip end in a tip body by a coil spring or the like to close a gap between the ball and the leading tip end, thereby suppressing ink dripping as in a conventional manner is therefore eliminated, the effect of suppressing ink dripping can be obtained, the need of disposing the coil spring or the like in the tip body is therefore eliminated, a decrease in the number of parts is therefore caused, and the ball-point pen refill can be preferably used in retractable and/or low-price products.

(Oil-Based Ball-Point Pen Refill)

The oil-based ball-point pen refill comprises an ink housing cylinder and a ball-point pen tip mounted directly or via a tip holder on a leading end of the ink housing cylinder, wherein the oil-based ball-point pen ink composition is housed in the ink housing cylinder. Further, the ball-point pen tip rotatably carries a ball.

In the present invention, a material that can be adopted for the ink housing cylinder is preferably polypropylene from the viewpoint of chemical resistance, moisture permeability, air permeability, and the like. However, in the case of using a salt-forming dye of an azo skeleton acid dye and a triarylmethane skeleton basic dye preferably, and polyvinyl butyral resin, used in the present invention, the salt-forming dye and the polyvinyl butyral resin have a high affinity for the ink housing cylinder made of polypropylene, and ink easily adheres to an inner wall, thereby precluding recognition of the residual amount of the ink, when the ink moves in the ink housing cylinder. Thus, it is preferable to treat the inner wall of the ink housing cylinder with silicone in the case of using the ink housing cylinder made of polypropylene. Silicone is applied to the inner wall of the ink housing cylinder, whereby the relationship of allowing the silicone to intermediately exist can be maintained without direct contact between polypropylene, which is a housing cylinder material, and ink, to prevent ink from adhering to the inner wall of the housing cylinder when the ink moves.

Examples of silicone materials include dimethyl silicone, methylphenyl silicone, methyl hydrogen silicone, alkyl aralkyl silicone, polyether silicone, and high fatty acid ester fatty acid silicone. Of these, alkyl aralkyl silicone is preferable because of having an excellent adhesion prevention property, non-reactivity, and high stability even with an oil-based ink component. As an application method, homogeneous and simultaneous application to an inner wall is most effective during extrusion molding.

In the present invention, the arithmetic mean roughness (Ra) of the surface of a ball is 0.1 to 15 nm. This is because an arithmetic mean roughness (Ra) of less than 0.1 nm results in the difficulty of sufficient adhesion of ink to the ball surface even in the case of using the polyvinyl butyral, in difficulty in offering a deep written trace during writing, and in easy occurrence of line skipping and/or patchiness in a written trace while an arithmetic mean roughness (Ra) of more than 15 nm results in a too rough ball surface to lead to the high rotational resistance between the ball and a ball seat, whereby a feeling of writing easily becomes poor, and, in addition, writing performance such as patchiness, line skipping, or line unevenness is easily influenced in a written trace. Particularly in a case in which the mean degree of polymerization is high, such as a case in which the mean degree of polymerization of the polyvinyl butyral resin is 1200 to 2000, the cohesion of ink easily becomes higher. Thus, the arithmetic mean roughness (Ra) of the ball surface is more preferably 1 to 15 nm, still more preferably 3 to 13 nm, and most preferably 5 to 10 nm, for facilitating adhesion of ink to the ball surface.

Such an arithmetic surface roughness can be measured with a model name SPI3800N manufactured by SEIKO EPSON CORPORATION.

The axially moving amount of the ball in the ball-point pen tip used in the present invention is preferably 5 μm to 20 μm. This is because an amount of less than 5 μm results in difficulty in transferring ink held on the ball to a paper surface, thereby precluding a deep written trace, while an amount of more than 20 μm results in easy occurrence of ink dripping. For further preventing ink dripping, the axially moving amount of the ball in the ball-point pen tip is more preferably 7 to 16 µm.

Further, a ball protrusion and the inner diameter of a ball holding chamber are not particularly limited. For allowing the amount of consumed ink per 100 m to be a desirable value (30 to 80 mg), it is preferable that the ball protrusion is 10.0 to 30.0% of a ball diameter, the inner diameter of the ball holding chamber is 105.0 to 120.0% of the ball diameter, and a ball seat diameter is 70 to 95% of the ball diameter.

The material of the ball used in the present invention is not particularly limited but may be, for example, each simple substance or alloy of various metals, ceramic, or the like. Specifically, a metal simple substance such as steel, copper, aluminum, or nickel may be used, or an alloy such as nickel silver or stainless steel may be used. For example, a carbide, oxide, nitride, boride, silicide, or the like of a metal or the like may also be used. As the carbide, a carbide of titanium, vanadium, chromium tantalum, niobium, molybdenum, boron, zirconium, tungsten, silicon, or the like may be used. As the oxide, an oxide of aluminum, chromium magnesium, silicon, beryllium, thorium, titanium, calcium, zirconium, or the like may be used. As the nitride, a nitride of titanium, boron, silicon, silicon, aluminum, or the like may be used. As the boride, a boride of zirconium, chromium, titanium, or the like may be used. As the silicide, a silicide of molybdenum, titanium, chromium, or the like may be used. For allowing a feeling of writing, the wear of a ball seat, and stability over time to be more favorable, a ceramic ball is preferable. The diameter of the ball body is not particularly limited but is commonly around 0.25 mm to 2.0 mm.

Further, the material of the ball-point pen tip body used in the present invention is not particularly limited but may be, for example, each simple substance or alloy of various metals, ceramic, a resin, or the like. Specifically, a metal simple substance such as steel, copper, aluminum, or nickel may be used, or an alloy such as nickel silver or stainless steel may be used. The tip body made of nickel silver is preferable because a feeling of writing can be improved, and workability in cutting or the like is high. Alternatively, the tip body made of stainless steel is preferable for the wear of the ball seat and high stability over time.

It is preferable that the crimping angle of the ball-point pen tip is 90 degrees or less and preferably 80 degrees or less because the too large crimping angle results in the tendency of a smaller paper contacting angle. A crimping angle of 50 degrees to 90 degrees is preferred because a crimping angle of 50 degrees or less results in the tendency of a smaller space in which ink is reserved between the ball 9 and the leading end edge of the tip, thereby precluding the return of the ink and the suppression of the wicking of the ink.

Further, the ejection of a large amount to a paper surface is preferable for offering a deep written trace, and it is difficult to offer the deep written trace when the amount of consumed ink per 100 m of the oil-based ball-point pen refill is less than 30 mg. Further, it is difficult to suppress ink dripping in the case of more than 80 mg, and therefore, the amount of consumed ink per 100 m is preferably 30 mg to 80 mg. An amount of 45 to 70 mg is more preferred; this is because an amount of 45 mg or more is preferable for a deeper written trace, and an amount of 70 mg or less is preferable for more performance against ink dripping and suppressing blobbing.

With regard to the amount of consumed ink, the average value of the amounts of consumed ink per 100 m, obtained by conducting a spiral writing test using five test samples at a writing rate of 4 m/min under conditions of 20° C., a writing angle of 70° on writing paper: HS P3201 writing paper, and a writing load of 200 g, is defined as the amount of consumed ink per 100 m.

Not only an increase in the amount of consumed ink but also a relationship between the selection of the coloring agent and the ball diameter is important for a deep written trace. Use of a salt-forming dye of an azo skeleton acid dye and a basic dye, and satisfaction of $40 \leq M/R \leq 100$ on the assumption that the amount of consumed ink per 100 m of the oil-based ball-point pen refill is M (mg) and the ball diameter is R (mm) are preferred because a deeper written trace can be offered. In particular, in the case of using the salt-forming dye of the azo skeleton acid dye and the basic dye, a deeper written trace can be offered when the amount M (mg) of consumed ink per 100 m of the oil-based ball-point pen refill and the ball diameter R (mm) satisfy $40 \leq M/R \leq 100$. Further, with regard to the relationship of $40 \leq M/R \leq 100$, the case of $40 > M/R$ results in the insufficient amount of consumed ink with respect to the ball diameter, thereby precluding a deep written trace and a favorable feeling of writing and obtaining the sufficient effect of the salt-forming dye of the azo skeleton acid dye and the basic dye, while the case of $M/R > 100$ results in ink dripping and blobbing from the gap between the ball and the leading tip end, whereby a written trace drying property is also easily influenced. The relationship of $50 \leq M/R \leq 70$ is more preferred because a deeper written trace can be offered, and ink dripping can be further prevented. As a specific example, the relationship of $40 \leq M/R \leq 100$ can be satisfied when the amount M (mg) of consumed ink per 100 m is M=30 to 100 (mg) in a case in which the ball diameter is R (mm)=1.0 (mm).

EXAMPLES

Embodiments of the ball-point pen of the present invention will be described below with reference to the drawings, but the present invention is not limited to the following embodiments.

Example 101

In a ball-point pen refill 1 of Example 101 illustrated in FIGS. 1 and 2, a ball-point pen tip 4 in which a ball 3 having a ball diameter (φ 0.7 mm) and an arithmetic mean roughness (Ra) of 6 nm of a ball surface is rotatably held is mounted in a leading end of an ink housing cylinder 2, and an oil-based ball-point pen ink 10 (0.2 g) of Example 101 is housed directly in the ink housing cylinder 2, thereby obtaining the ball-point pen refill 1.

Specifically, in the ball-point pen tip 4, a stainless steel wire rod of φ 2.3 mm having a hardness of 230 Hv to 280 Hv is cut to a desired length, a ball holding chamber 6, an ink circulation hole 7, and ink circulation grooves 8 that radially extend from the ink circulation hole 7 are produced, and a ball seat 9 having a generally circular arc plane shape is then formed on the bottom wall of the ball holding chamber 6. Then, the ball 3 with a silicon nitride material is put on the ball seat 9, and a leading tip end 5 is crimped inwardly.

Further, a ball protrusion H that protrudes from the leading tip end in a state in which the ball 3 is put on the ball seat 9 is 30.0% of the ball diameter, an crimping angle α is 70 degrees, the clearance in the longitudinal direction of the ball 3 is 15 µm, the inner diameter of the ball holding chamber is 104.0% of the ball diameter, and the diameter of the ball seat 9 is 86.0% of the ball diameter.

A dye as a coloring agent, benzyl alcohol and ethylene glycol monophenyl ether as organic solvents, polyvinyl butyral resin, a phosphate ester-based surfactant as a lubricant, oxyethylene alkylamine as an organic amine, and polyvinylpyrrolidone as a stringiness-imparting agent were adopted, weighed in predetermined amounts, warmed to 60° C., and then completely dissolved using a disperser stirring machine, thereby obtaining an oil-based ball-point pen ink composition of Example 101.

The specific formulation amounts thereof are as described below. Measurement of the ink viscosity of Example 101 showed ink viscosity=23000 mPa·s using a viscometer VISCOMETER RVDVII+Pro CP-52 Spindle, manufactured by Brookfield Engineering Laboratories, Inc., at a shear rate of 5 sec$^{-1}$ (rotation number of 2.5 rpm) under an environment of 20° C. Further, the amount of consumed ink per 100 m was 45 mg/100 m.

Example 101 (Ink Formulation)

| | |
|---|---|
| Coloring agent | 18.0 mass % |
| (Salt-forming dye of Acid Yellow36 and Basic Violet1: manufactured by ORIENT CHEMICAL INDUSTRIES CO., LTD.) | |
| Organic solvent (benzyl alcohol) | 54.0 mass % |
| Organic solvent (ethylene glycol monophenyl ether) | 16.5 mass % |
| Polyvinyl butyral resin | 9.0 mass % |
| (S-LEC BH-3: manufactured by SEKISUI CHEMICAL CO., LTD., hydroxyl group content: 34 mol %, mean degree of polymerization: 1700) | |
| Lubricant | 1.0 mass % |
| (phosphate ester-based surfactant: PLYSURF A208N: manufactured by DKS Co. Ltd.) | |
| Organic amine | 1.0 mass % |
| (oxyethylene alkylamine: NYMEEN L201: manufactured by NOF CORPORATION) | |
| Stringiness-imparting agent | 0.5 mass % |
| (polyvinylpyrrolidone K90: ISB Japan Ltd.) | |

Test and Evaluation

The oil-based ball-point pen refill produced in Example 101 was disposed in an oil-based ball-point pen (trade name: SUPERGRIP) manufactured in PILOT CORPORATION, to produce an oil-based ball-point pen, which was subjected to the following tests and evaluations using writing paper JIS P3201 as writing test paper. The obtained evaluations are shown in Table 1.

Deepness of Written Trace: A trace written by handwriting was observed.

| | |
|---|---|
| Deep, clear written trace | A |
| Deep written trace | B |
| Written trace having practically nonproblematic deepness | C |
| Light written trace | D |

Ink Dripping Test: Its pen point was left standing for 7 days with the pen point facing downward under an environment of 30° C. and 85% RH, and leakage of ink from the leading tip end was confirmed.

| | |
|---|---|
| No drop of ink on leading tip end | A |
| Drop of ink on leading tip end was ¼ or less of taper portion | B |
| Drop of ink on leading tip end was ¼ or more and ½ or less of taper portion | C |
| Drop of ink on leading tip end was ½ or more of taper portion | D |

Feeling of Writing: A sensory test by handwriting was conducted to carry out evaluation.

| | |
|---|---|
| Very smooth | A |
| Smooth | B |
| Smooth at practically nonproblematic level | C |
| Heavy | D |

Writing Performance Test: After writing on a paper surface, a written trace was observed.

Patchiness, line skipping, patchiness, line unevenness, etc. in written trace, without any practical problem A Poor patchiness, line skipping, patchiness, line unevenness, etc. in written trace, with poor practicality D Examples 102 to 111

The oil-based ball-point pen ink compositions and oil-based ball-point pen refills of Examples 102 to 111 were obtained in the same procedure as in Example 1 except that the ink formulation and the arithmetic mean roughness (Ra) of the ball surface were changed, as shown in Tables 1 and 2. Tests and evaluations were conducted in the same manner as in Example 101. The measurement and evaluation results are shown in Tables 1 and 2.

TABLE 1

| | | Example | | | | | |
|---|---|---|---|---|---|---|---|
| | | Example 101 | Example 102 | Example 103 | Example 104 | Example 105 | Example 106 |
| Dye | $^{(1)}$ Salt-forming dye of Acid Yellow36 and Basic Violet 1 (monoazo skeleton acid dye + triarylmethane skeleton basic dye) | 18.0 | | 18.0 | | 18.0 | 10.0 |
| | $^{(1)}$ Salt-forming dye of diazo skeleton acid dye and Basic Viole 4 (diazo skeleton acid dye + triarylmethane skeleton basic dye) | | 18.0 | | | | |
| | $^{(2)}$ Salt-forming dye of organic acid and Basic Violet 1 (alkylbenzene sulfonic acid + basic dye) | | | | 18.0 | | |
| | $^{(1)}$ Salt-forming dye of Acid Yellow42 and Basic Violet 4 (diazo skeleton acid dye + triarylmethane skeleton basic dye) | | | | | | |

TABLE 1-continued

|  |  | Example 101 | Example 102 | Example 103 | Example 104 | Example 105 | Example 106 |
|---|---|---|---|---|---|---|---|
| Resin | [3] Polyvinyl butyral resin (hydroxyl group content: 34 mol %, mean degree of polymerization 1700) | 9.0 |  |  | 9.0 | 10.5 | 18.0 |
|  | [4] Polyvinyl butyral resin (hydroxyl group content: 36 mol %, mean degree of polymerization 300) |  |  | 22.0 |  |  |  |
|  | [5] Polyvinyl butyral resin (hydroxyl group content: 30 mol %, mean degree of polymerization 1300) |  | 9.0 |  |  |  |  |
|  | [6] Ketone resin |  |  |  |  | 4.5 | 2.0 |
| Organic solvent | Benzyl alcohol | 54.0 | 54.0 | 45.5 | 54.0 | 49.5 | 52.0 |
|  | Ethylene glycol monophenyl ether | 16.5 | 16.5 | 12.0 | 16.5 | 15.0 | 15.0 |
| Surfactant | [7] Phosphate ester-based surfactant | 1.0 |  | 1.0 | 1.0 | 1.0 |  |
|  | [8] Phosphate ester-based surfactant |  | 1.0 |  |  |  | 1.0 |
| Organic amine | [9] Oxyethylene alkylamine | 1.0 | 1.0 | 1.0 | 1.0 | 1.0 | 1.0 |
| Stringiness-imparting agent | [10] Polyvinylpyrrolidone K90 | 0.5 | 0.5 | 0.5 | 0.5 | 0.5 | 1.0 |
| Stabilizer | Oleic acid |  |  |  |  |  |  |
| Viscosity modifier | [11] Fatty acid amide wax |  |  |  |  |  |  |
| Total |  | 100.0 | 100.0 | 100.0 | 100.0 | 100.0 | 100.0 |
| Arithmetic mean roughness (Ra) (nm) of ball surface |  | 6 | 6 | 6 | 6 | 6 | 6 |
| Polyvinyl butyral resin/total resin content |  | 94.7% | 94.7% | 97.8% | 94.7% | 67.7% | 85.7% |
| Amount (mg) of consumed ink per 100 m |  | 45 | 45 | 45 | 45 | 45 | 45 |
| Ink viscosity (mPa·s) at 20° C. and shear rate of 5 sec$^{-1}$ (2.5 rpm) |  | 23000 | 25000 | 25000 | 25000 | 23000 | 30000 |
| Evaluation | Deepness of written trace | A | A | A | B | A | A |
|  | Ink dripping test | A | A | B | A | B | A |
|  | Feeling of writing | A | A | B | B | B | B |
|  | Writing performance | A | A | A | A | A | A |

[1] Salt-forming dye of basic dye and acid dye, manufactured by ORIENT CHEMICAL INDUSTRIES CO., LTD.
[2] Salt-forming dye of basic dye and organic acid, manufactured by Hodogaya Chemical Co., Ltd.
[3] S-LEC BH-3, manufactured by SEKISUI CHEMICAL CO., LTD.
[4] S-LEC BL-1, manufactured by SEKISUI CHEMICAL CO., LTD.
[5] S-LEC BH-6, manufactured by SEKISUI CHEMICAL CO., LTD.
[6] HILACK 110H, manufactured by Hitachi Chemical Company, Ltd.
[7] PLYSURF A208N, manufactured by DKS Co. Ltd. (alkyl group: mixture of carbon numbers of 12 and 13, acid value: 160 to 185)
[8] PHOSPHANOL RS610, manufactured by TOHO CHEMICAL INDUSTRY Co., Ltd. (alkyl group: carbon number of 13, acid value: 75 to 90)
[9] NYMEEN L201, manufactured by NOF CORPORATION (total amine number: 232 to 246, secondary amine)
[10] Product manufactured by ISP Japan Ltd.

TABLE 2

|  |  | Example 107 | Example 108 | Example 109 | Example 110 | Example 111 |
|---|---|---|---|---|---|---|
| Dye | [1] Salt-forming dye of Acid Yellow36 and Basic Violet 1 (monoazo skeleton acid dye + triarylmethane skeleton basic dye) | 18.0 | 18.0 |  | 18.0 |  |
|  | [1] Salt-forming dye of diazo skeleton acid dye and Basic Viole 4 (diazo skeleton acid dye + triarylmethane skeleton basic dye) |  |  |  |  | 18.0 |
|  | [2] Salt-forming dye of organic acid and Basic Violet 1 (alkylbenzene sulfonic acid + basic dye) |  |  |  |  |  |
|  | [1] Salt-forming dye of Acid Yellow42 and Basic Violet 4 (diazo skeleton acid dye + triarylmethane skeleton basic dye) |  |  | 19.0 |  |  |

TABLE 2-continued

|  |  | Example 107 | Example 108 | Example 109 | Example 110 | Example 111 |
|---|---|---|---|---|---|---|
| Resin | (3) Polyvinyl butyral resin (hydroxyl group content: 34 mol %, mean degree of polymerization 1700) | 9.0 |  |  | 9.0 |  |
|  | (4) Polyvinyl butyral resin (hydroxyl group content: 36 mol %, mean degree of polymerization 300) |  |  | 17.0 |  |  |
|  | (5) Polyvinyl butyral resin (hydroxyl group content: 30 mol %, mean degree of polymerization 1300) |  | 21.2 |  |  | 9.0 |
|  | (6) Ketone resin |  |  |  |  |  |
| Organic solvent | Benzyl alcohol | 55.0 | 55.5 | 47.0 | 54.0 | 54.0 |
|  | Ethylene glycol monophenyl ether | 17.5 |  | 11.7 | 16.5 | 16.5 |
| Surfactant | (7) Phosphate ester-based surfactant |  | 2.0 | 2.0 | 1.0 |  |
|  | (8) Phosphate ester-based surfactant |  |  |  |  | 1.0 |
| Organic amine | (9) Oxyethylene alkylamine |  | 2.0 | 2.0 | 1.0 | 1.0 |
| Stringiness-imparting agent | (10) Polyvinylpyrrolidone K90 | 0.5 | 0.3 | 0.3 | 0.5 | 0.5 |
| Stabilizer | Oleic acid |  |  | 1.0 | 1.0 |  |
| Viscosity modifier | (11) Fatty acid amide wax |  |  |  |  |  |
| Total |  | 100.0 | 100.0 | 100.0 | 100.0 | 100.0 |
| Arithmetic mean roughness (Ra) (nm) of ball surface |  | 6 | 6 | 6 | 9 | 13 |
| Polyvinyl butyral resin/total resin content |  | 94.7% | 98.6% | 98.3% | 94.7% | 94.7% |
| Amount (mg) of consumed ink per 100 m |  | 45 | 30 | 45 | 45 | 45 |
| Ink viscosity (mPa·s) at 20° C. and shear rate of 5 sec$^{-1}$ (2.5 rpm) |  | 23000 | 33000 | 16000 | 23000 | 25000 |
| Evaluation | Deepness of written trace | A | B | A | A | A |
|  | Ink dripping test | A | A | B | A | A |
|  | Feeling of writing | B | B | A | A | B |
|  | Writing performance | A | A | A | A | A |

Comparative Examples 101 to 104

Oil-based ball-point pen ink compositions and oil-based ball-point pen refills were obtained in the same procedure as in Example 101 except that changes of the ink formulation, such as containing of no polyvinyl butyral, were made, as shown in Table 3. Tests and evaluations were conducted in the same manner as in Example 101. The measurement and evaluation results are shown in Table 3. As is clear from Table 3, Comparative Examples 101, 102, and 104 resulted in poor performance against ink dripping and poor feelings of writing, and Comparative Example 103 resulted in poor performance against ink dripping, compared to Example 101.

TABLE 3

|  |  | Comparative Example 101 | Comparative Example 102 | Comparative Example 103 | Comparative Example 104 |
|---|---|---|---|---|---|
| Dye | (1) Salt-forming dye of Acid Yellow36 and Basic Violet 1 (monoazo skeleton acid dye + triarylmethane skeleton basic dye) | 18.0 | 10.0 | 18.0 |  |
|  | (1) Salt-forming dye of diazo skeleton acid dye and Basic Violet 4 (diazo skeleton acid dye + triarylmethane skeleton basic dye) |  |  |  |  |
|  | (2) Salt-forming dye of organic acid and Basic Violet 1 (alkylbenzene sulfonic acid + basic dye) |  |  |  | 18.0 |
| Resin | (3) Polyvinyl butyral resin (hydroxyl group content: 34 mol %, mean degree of polymerization 1700) |  |  |  |  |
|  | (4) Polyvinyl butyral resin (hydroxyl group content: 36 mol %, mean degree of polymerization 300) |  |  |  | 10.0 |
|  | (5) Polyvinyl butyral resin (hydroxyl group content: 30 mol %, mean degree of polymerization 1300) |  |  |  |  |
|  | (6) Ketone resin | 30.0 | 35.0 | 5.0 | 15.0 |

TABLE 3-continued

|  |  | Comparative Example | | | |
|---|---|---|---|---|---|
|  |  | Comparative Example 101 | Comparative Example 102 | Comparative Example 103 | Comparative Example 104 |
| Organic solvent | Benzyl alcohol | 39.5 | 34.5 | 56.5 | 43.5 |
|  | Ethylene glycol monophenyl ether | 10.0 | 17.0 | 18.0 | 11.0 |
| Surfactant | (7)Phosphate ester-based surfactant | 1.0 |  | 1.0 | 1.0 |
|  | (8)Phosphate ester-based surfactant |  | 1.0 |  |  |
| Organic amine | (9)Oxyethylene alkylamine | 1.0 |  | 1.0 | 1.0 |
| Stringiness-imparting agent | (10)Polyvinylpyrrolidone K90 | 0.5 | 0.5 | 0.5 | 0.5 |
| Stabilizer | Oleic acid |  |  |  |  |
| Viscosity modifier | (11)Fatty acid amide wax |  | 2.0 |  |  |
|  | Total | 100.0 | 100.0 | 100.0 | 100.0 |
|  | Arithmetic mean roughness (Ra) (nm) of ball surface | 6 | 6 | 6 | 6 |
|  | Polyvinyl butyral resin/total resin content | 0.0% | 0.0% | 0.0% | 39.2% |
|  | Amount (mg) of consumed ink per 100 m | 45 | 45 | 100 | 45 |
|  | Ink viscosity (mPa · s) at 20° C. and shear rate of 5 sec$^{-1}$ (2.5 rpm) | 23000 | 20000 | 5000 | 25000 |
| Evaluation | Deepness of written trace | A | A | A | A |
|  | Ink dripping test | D | D | D | D |
|  | Feeling of writing | D | D | D | D |
|  | Writing performance | A | A | A | A |

Reference Example 101

An oil-based ball-point pen ink composition and an oil-based ball-point pen refill were obtained in the same procedure as in Example 101 except that the content of benzyl alcohol was 25.5 mass %, the content of ethylene glycol monophenyl ether was 4.0 mass %, polyvinyl butyral was S-LEC BL-1 (hydroxyl group content: 36 mol %, and mean degree of polymerization: 300, manufactured by SEKISUI CHEMICAL CO., LTD.), and the content thereof was changed to 50.0 mass %. As a result of conducting tests and evaluations in the same manner as in Example 101, the amount of consumed ink was 20 mg per 100 m at ink viscosity=60000 mPa·s. Further, Reference Example 101 resulted in the poor deepness of a written trace and poor performance against ink dripping, compared to Example 101.

Reference Example 102

An oil-based ball-point pen ink composition and an oil-based ball-point pen refill were obtained in the same procedure as in Example 101 except that the content of benzyl alcohol was 43.5 mass %, the content of ethylene glycol monophenyl ether was 11.0 mass %, polyvinyl butyral was S-LEC BL-1 (hydroxyl group content: 36 mol %, and mean degree of polymerization: 300, manufactured by SEKISUI CHEMICAL CO., LTD.), the content thereof was 10.0 mass %, and, in addition, 15.0 mass % of HILACK 110H (manufactured by Hitachi Chemical Company, Ltd.) was contained as ketone resin. As a result of conducting tests and evaluations in the same manner as in Example 101, the amount of consumed ink was 45 mg per 100 m at ink viscosity=25000 mPa·s. Further, Reference Example 102 resulted in poor performance against ink dripping and a poor feeling of writing, compared to Example 101.

Reference Example 103

An oil-based ball-point pen ink composition and an oil-based ball-point pen refill were obtained in the same procedure as in Example 101 except that the arithmetic mean roughness (Ra) of a ball surface was changed to 22 nm. As a result of conducting tests and evaluations in the same manner as in Example 101, the amount of consumed ink was 45 mg per 100 m at ink viscosity=23000 mPa·s. Further, Reference Example 103 resulted in a poor feeling of writing and poor writing performance, compared to Example 101.

Reference Example 104

An oil-based ball-point pen ink composition and an oil-based ball-point pen refill were obtained in the same procedure as in Example 101 except that the content of benzyl alcohol was 43.5 mass %, the content of ethylene glycol monophenyl ether was 11.0 mass %, polyvinyl butyral was S-LEC BL-1 (hydroxyl group content: 36 mol %, and mean degree of polymerization: 300, manufactured by SEKISUI CHEMICAL CO., LTD.), the content thereof was 10.0 mass %, in addition, 15.0 mass % of HILACK 110H (manufactured by Hitachi Chemical Company, Ltd.) was contained as ketone resin, and the arithmetic mean roughness (Ra) of a ball surface was changed to 13 nm. As a result of conducting tests and evaluations in the same manner as in Example 101, the amount of consumed ink was 45 mg per 100 m at ink viscosity=25000 mPa·s. Further, Reference Example 104 resulted in poor performance against ink dripping and a poor feeling of writing, compared to Example 101.

Examples 201 to 208

The oil-based ball-point pen ink compositions and oil-based ball-point pen refills of Examples 201 to 208 were obtained in the same procedure as in Example 1 except that the ink formulation was changed as shown in Table 4. The same tests and evaluations as in Example 101 except the test for writing performance were conducted. The measurement and evaluation results are shown in Table 4.

TABLE 4

|  |  | Example 201 | Example 202 | Example 203 | Example 204 | Example 205 | Example 206 | Example 207 | Example 208 |
|---|---|---|---|---|---|---|---|---|---|
| Dye | (1) Salt-forming dye of Acid Yellow36 and Basic Violet1 (monoazo skeleton acid dye + triarylmethane skeleton basic dye) | 18.0 | 18.0 | 18.0 |  | 18.0 |  |  |  |
|  | (1) Salt-forming dye of diazo skeleton acid dye and Basic Violet4 (diazo skeleton acid dye + triarylmethane skeleton basic dye) |  |  |  |  |  |  |  |  |
|  | (2) Salt-forming dye of organic acid and Basic Violet1 (alkylbenzene sulfonic acid + basic dye) |  |  |  |  |  |  |  |  |
|  | (1) Salt-forming dye of Acid Yellow 42 and Basic Violet1 (diazo skeleton acid dye + triarylmethane skeleton basic dye) |  |  |  | 12.0 |  |  |  | 5.0 |
|  | (1) Salt-forming dye of Acid Yellow36 and Basic Violet4 (monoazo skeleton acid dye + triarylmethane skeleton basic dye) |  |  |  |  |  | 20.0 |  | 3.0 |
|  | (1) Salt-forming dye of Acid Yellow42 and Basic Violet4 (diazo skeleton acid dye + triarylmethane skeleton basic dye) |  |  |  |  |  |  | 19.0 |  |
| Resin | (3) Polyvinyl butyral resin (hydroxyl group content: 34 mol %, mean degree of polymerization 1700) | 6.0 | 25.0 |  |  |  |  |  |  |
|  | (4) Polyvinyl butyral resin (hydroxyl group content: 36 mol %, mean degree of polymerization 300) |  |  | 16.0 | 18.0 |  | 16.5 | 17.0 | 22.0 |
|  | (5) Polyvinyl butyral resin (hydroxyl group content: 30 mol %, mean degree of polymerization 1300) |  |  |  |  | 21.2 |  |  |  |
|  | (6) Ketone resin |  |  |  |  |  |  |  |  |
| Organic solvent | Benzyl alcohol | 57.5 | 39.5 | 60.8 | 65.8 | 58.5 | 49.0 | 49.4 | 53.2 |
|  | Ethylene glycol monophenyl ether | 16.0 | 15.0 |  |  |  | 12.2 | 12.3 | 13.3 |
| Surfactant | (7) Phosphate ester-based surfactant | 1.0 | 1.0 |  | 2.0 | 1.0 | 1.0 | 1.0 | 1.0 |
|  | (8) Phosphate ester-based surfactant |  |  | 2.0 |  |  |  |  |  |
| Organic amine | (9) Oxyethylene alkylamine | 1.0 | 1.0 | 2.0 | 2.0 | 1.0 | 1.0 | 1.0 | 1.0 |
| Stringiness-imparting agent | (10) Polyvinylpyrrolidone K90 | 0.5 | 0.5 | 0.2 | 0.2 | 0.3 | 0.3 | 0.3 | 0.5 |
| Stabilizer | Oleic acid |  |  |  | 1.0 |  |  |  | 1.0 |
| Viscosity modifier | (11) Fatty acid amide wax |  |  |  |  |  |  |  |  |
| Total |  | 100.0 | 100.0 | 100.0 | 100.0 | 100.0 | 100.0 | 100.0 | 100.0 |
| polyvinyl butyral resin having hydroxyl group content of 25 mol % or more/total resin content |  | 92.3% | 98.0% | 98.8% | 98.9% | 98.6% | 98.2% | 98.3% | 97.8% |
| Amount (mg) of consumed ink per 100 m |  | 50 | 30 | 40 | 40 | 30 | 45 | 45 | 45 |
| Ink viscosity (mPa · s) at 20° C. and shear rate of 5 sec$^{-1}$ (2.5 rpm) |  | 9000 | 51000 | 9000 | 8000 | 33000 | 14500 | 16000 | 14500 |
| Evaluation | Deepness of written trace | A | B | A | A | B | A | A | A |
|  | Ink dripping test | B | A | B | B | A | B | B | B |
|  | Feeling of writing | A | B | A | A | B | A | A | A |

(1) Salt-forming dye of basic dye and acid dye, manufactured by ORIENT CHEMICAL INDUSTRIES CO., LTD.
(2) Salt-forming dye of basic dye and organic acid, manufactured by Hodogaya Chemical Co., Ltd.
(3) S-LEC BH-3, manufactured by SEKISUI CHEMICAL CO., LTD.
(4) S-LEC BL-1, manufactured by SEKISUI CHEMICAL CO., LTD.
(5) S-LEC BH-6, manufactured by SEKISUI CHEMICAL CO., LTD.
(6) HILACK 110H, manufactured by Hitachi Chemical Company, Ltd.
(7) PLYSURF A208N, manufactured by DKS Co. Ltd. (alkyl group: mixture of carbon numbers of 12 and 13, acid value: 160 to 185)
(8) PHOSPHANOL RS610, manufactured by TOHO CHEMICAL INDUSTRY Co., Ltd. (alkyl group: carbon number of 13, acid value: 75 to 90)
(9) NYMEEN L201, manufactured by NOF CORPORATION (total amine number: 232 to 246, secondary amine)
(10) Product manufactured by ISP Japan Ltd.
(11) Product manufactured by Kyoeisha Chemical Co., Ltd.
(12) S-LEC BH-S, manufactured by SEKISUI CHEMICAL CO., LTD.

Comparative Examples 201 and 202

Oil-based ball-point pen ink compositions and oil-based ball-point pen refills were obtained in the same procedure as in Example 101 except that changes of the ink formulation, such as containing of no polyvinyl butyral, were made, as shown in Table 5. Tests and evaluations were conducted in the same manner as in Example 101 except the test for writing performance. The measurement and evaluation results are shown in Table 5. As is clear from Table 5, Comparative Examples 5 and 6 resulted in poor performance against ink dripping and poor feelings of writing, compared to Example 101.

TABLE 5

|  |  | Comparative Example 201 | Comparative Example 202 |
|---|---|---|---|
| Dye | (1)Salt-forming dye of Acid Yellow36 and Basic Violet1 (monoazo skeleton acid dye + triarylmethane skeleton basic dye) |  | 10.0 |
|  | (1)Salt-forming dye of diazo skeleton acid dye and Basic Violet4 (diazo skeleton acid dye + triarylmethane skeleton basic dye) | 18.0 |  |
|  | (2)Salt-forming dye of organic acid and Basic Violet1 (alkylbenzene sulfonic acid + basic dye) |  |  |
| Resin | (3)Polyvinyl butyral resin (hydroxyl group content: 34 mol %, mean degree of polymerization 1700) |  |  |
|  | (4)Polyvinyl butyral resin (hydroxyl group content: 36 mol %, mean degree of polymerization 300) |  |  |
|  | (12)Polyvinyl butyral resin (hydroxyl group content: 22 mol %, mean degree of polymerization 1000) |  |  |
|  | (6)Ketone resin | 45.0 | 35.0 |
| Organic solvent | Benzyl alcohol | 26.5 | 34.5 |
|  | Ethylene glycol monophenyl ether | 8.0 | 17.0 |
| Surfactant | (7)Phosphate ester-based surfactant | 1.0 | 1.0 |
|  | (8)Phosphate ester-based surfactant |  |  |
| Organic amine | (9)Oxyethylene alkylamine | 1.0 |  |
| Stringiness-imparting agent | (10)Polyvinylpyrrolidone K90 | 0.5 | 0.5 |
| Stabilizer | Oleic acid |  |  |
| Viscosity modifier | (11)Fatty acid amide wax |  | 2.0 |
|  | Total | 100.0 | 100.0 |
|  | polyvinyl butyral resin having hydroxyl group content of 25 mol % or more/total resin content | 0.0% | 0.0% |
|  | Amount (mg) of consumed ink per 100 m | 45 | 45 |
|  | Ink viscosity (mPa · s) at 20° C. and shear rate of 5 sec$^{-1}$ (2.5 rpm) | 35000 | 20000 |
| Evaluation | Deepness of written trace | A | A |
|  | Ink dripping test | D | D |
|  | Feeling of writing | D | D |

Reference Example 201

An oil-based ball-point pen ink composition and an oil-based ball-point pen refill were obtained in the same procedure as in Example 101 except that the content of benzyl alcohol was 54.5 mass %, the content of ethylene glycol monophenyl ether was 15.0 mass %, polyvinyl butyral was S-LEC BH-S (hydroxyl group content: 22 mol %, and mean degree of polymerization: 1000, manufactured by SEKISUI CHEMICAL CO., LTD.), and the content thereof was changed to 10.0 mass %. As a result of conducting tests and evaluations in the same manner as in Example 101 except the test for writing performance, the amount of consumed ink was 45 mg per 100 m at ink viscosity=25000 mPa·s. Further, Reference Example 201 resulted in poor performance against ink dripping and a poor feeling of writing, compared to Example 101.

Example 301

The oil-based ball-point pen ink composition and oil-based ball-point pen refill of Example 301 were obtained in the same procedure as in Example 101 except that the ink formulation was changed, as shown in Table 6. In addition to an ink dripping test and a test for a feeling of writing, the following tests and evaluations were conducted using writing paper JIS P3201 as writing test paper. The obtained evaluations are shown in Table 6.

Further, in Example 301, the range of Y/X=0.32 to 0.39 was satisfied on the assumption that the total amine number of the organic amine was X and the acid value of the phosphate ester-based surfactant was Y.

Further, the amount (M) of consumed ink per 100 m of Example 301 was 45 mg/100 m, and M/R=64 was satisfied when a spiral writing test was conducted with a ball-point pen refill having a ball diameter (R) of 0.7 mm.

Test and Evaluation

Test of Ink over Time: Each oil-based ball-point pen ink composition was put into a tight opening and closing glass test tube having a diameter of 15 mm, and was left standing for 1 month at ordinary temperature, an appropriate amount of ink was collected and observed with a microscope.

| | |
|---|---|
| Favorable with stable dissolution and without separation or any precipitates | A |
| Favorable with slight separation or slight generation of precipitates | B |
| Separation or generation of precipitates without any practical problem | C |
| Separation or generation of precipitates, preventing production of ink or causing poor writing | D |

Dry Up Performance Test:

An exposed pen point was left standing for 2 weeks at 50° C., and the state of a trace written by handwriting was then evaluated.

| | |
|---|---|
| Favorable written trace without patchiness | A |
| Nonproblematic written trace with slight patchiness | B |
| Written trace with patchiness | C |
| Written trace with poor patchiness | D |

Examples 302 to 316

Ink formulation was performed in the same procedure as in Example 101 except that each component was changed, as shown in Tables, to obtain the oil-based ball-point pen ink compositions of Examples 302 to 316. The measurement and evaluation results are shown in Tables 6, 7, and 8.

Further, in Examples 302 to 316, the range of Y/X=0.2 to 0.8 was satisfied on the assumption that the total amine number of the organic amine was X and the acid value of the phosphate ester-based surfactant was Y.

TABLE 6

| | | Example 301 | Example 302 | Example 303 | Example 304 | Example 305 | Example 306 |
|---|---|---|---|---|---|---|---|
| Salt-forming dye of azo skeleton acid dye and triarylmethane skeleton basic dye | (1) Salt-forming dye of diazo skeleton acid dye and Basic Violet4 (diazo skeleton acid dye + triarylmethane skeleton basic dye) | 18.0 | | 18.0 | | 18.0 | 18.0 |
| | (1) Salt-forming dye of Acid Yellow36 and Basic Violet1 (monoazo skeleton acid dye + triarylmethane skeleton basic dye) | | 18.0 | | 18.0 | | |
| | (1) Salt-forming dye of Acid Yellow36 and Basic Violet4 (monoazo skeleton acid dye + triarylmethane skeleton basic dye) | | | | | | |
| | (2) Salt-forming dye of organic acid and basic dye (alkylbenzene sulfonic acid + basic dye) | | | | | | |
| Butyral resin | (3) Polyvinyl butyral resin (hydroxyl group content: 34 mol %, mean degree of polymerization 1700) | 10.0 | 9.0 | | 9.0 | | 10.0 |
| | (4) Polyvinyl butyral resin (hydroxyl group content: 36 mol %, mean degree of polymerization 300) | | | | | 22.0 | |
| | (5) Polyvinyl butyral resin (hydroxyl group content: 30 mol %, mean degree of polymerization 1300) | | | 9.0 | | | |
| Ketone resin | (6) Ketone resin | | | | | | 4.5 |
| Aromatic alcohol | Benzyl alcohol | 53.0 | 54.0 | 54.0 | 54.0 | 45.5 | 50.0 |
| Glycol ether | Ethylene glycol monophenyl ether | 16.5 | 16.5 | 16.5 | 16.5 | 12.0 | 15.0 |
| Surfactant | (7) Phosphate ester-based surfactant | 1.0 | | 1.0 | | 1.0 | 1.0 |
| | (8) Phosphate ester-based surfactant | | 1.0 | | 1.0 | | |
| Organic amine | (9) Oxyethylene alkylamine | 1.0 | 1.0 | 1.0 | 1.0 | 1.0 | 1.0 |
| Stringiness-imparting agent | (10) Polyvinylpyrrolidone KOO | 0.5 | 0.5 | 0.5 | 0.5 | 0.5 | 0.5 |
| Stabilizer | Oleic acid | | | | | | |
| Viscosity modifier | (11) Fatty acid amide wax | | | | | | |
| Polyvinyl butyral resin/total resin content | | 95.2% | 94.7% | 94.7% | 94.7% | 97.8% | 66.7% |
| Stringiness-imparting resin/total resin content | | 4.8% | 5.3% | 5.3% | 5.3% | 2.2% | 3.3% |
| Content of aromatic alcohol: A, content of glycol ether: B A/B | | 3.2 | 3.3 | 3.3 | 3.3 | 3.8 | 3.3 |
| Ink viscosity (mPa·s) at 20° C. and shear rate of 5 sec$^{-1}$ (2.5 rpm) | | 23000 | 25000 | 23000 | 25000 | 25000 | 23000 |
| Evaluation | Ink dripping test | A | A | A | A | B | B |
| | Test of ink over time | A | B | A | B | A | A |
| | Feeling of writing | A | A | A | A | B | B |
| | Dry up performance test | A | A | A | A | A | A |

(1) Product manufactured by ORIENT CHEMICAL INDUSTRIES CO., LTD.
(2) Product manufactured by Hodogaya Chemical Co., Ltd.
(3) S-LEC BH-3, manufactured by SEKISUI CHEMICAL CO., LTD.
(4) S-LEC BL-1, manufactured by SEKISUI CHEMICAL CO., LTD.
(5) S-LEC BH-6, manufactured by SEKISUI CHEMICAL CO., LTD.
(6) HILACK 110H, manufactured by Hitachi Chemical Company, Ltd.
(7) PHOSPHANOL RB410, manufactured by DKS Co. Ltd. (alkyl group: carbon number of 18, acid value: 80 to 90)
(8) PLYSURF A208N, manufactured by TOHO CHEMICAL INDUSTRY Co., Ltd. (alkyl group: mixture of carbon numbers of 12 and 13, acid value: 160 to 185)
(9) NYMEEN L201, manufactured by NOF CORPORATION (total amine number: 232 to 246, secondary amine)
(10) Product manufactured by ISP Japan Ltd.
(11) Product manufactured by Kyoeisha Chemical Co., Ltd.

TABLE 7

|  |  | Example 307 | Example 308 | Example 309 | Example 310 | Example 311 |
|---|---|---|---|---|---|---|
| Salt-forming dye of azo skeleton acid dye and triarylmethane skeleton basic dye | (1) Salt-forming dye of diazo skeleton acid dye and Basic Violet4 (diazo skeleton acid dye + triarylmethane skeleton basic dye) | 18.0 |  |  | 18.0 | 18.0 |
|  | (1) Salt-forming dye of Acid Yellow36 and Basic Violet1 (monoazo skeleton acid dye + triarylmethane skeleton basic dye) |  | 18.0 | 18.0 |  |  |
|  | (1) Salt-forming dye of Acid Yellow36 and Basic Violet4 (monoazo skeleton acid dye + triarylmethane skeleton basic dye) |  |  |  |  |  |
|  | (2) Salt-forming dye of organic acid and basic dye (alkylbenzene sulfonic acid + basic dye) |  |  |  |  |  |
| Butyral resin | (3) Polyvinyl butyral resin (hydroxyl group content: 34 mol %, mean degree of polymerization 1700) | 18.0 |  |  | 10.0 | 10.0 |
|  | (4) Polyvinyl butyral resin (hydroxyl group content: 36 mol %, mean degree of polymerization 300) |  | 16.0 |  |  |  |
|  | (5) Polyvinyl butyral resin (hydroxyl group content: 30 mol %, mean degree of polymerization 1300) |  |  | 21.2 |  |  |
| Ketone resin | (6) Ketone resin | 2.0 |  |  |  |  |
| Aromatic alcohol | Benzyl alcohol | 45.0 | 60.8 | 58.5 | 54.0 | 54.0 |
| Glycol ether | Ethylene glycol monophenyl ether | 14.0 |  |  | 15.5 | 17.5 |
| Surfactant | (7) Phosphate ester-based surfactant |  |  | 1.0 | 1.0 |  |
|  | (8) Phosphate ester-based surfactant | 1.0 | 2.0 |  |  |  |
| Organic amine | (9) Oxyethylene alkylamine | 1.0 | 2.0 | 1.0 | 1.0 |  |
| Stringiness-imparting agent | (10) Polyvinylpyrrolidone K90 | 1.0 | 0.2 | 0.3 | 0.5 | 0.5 |
| Stabilizer | Oleic acid |  | 1.0 |  |  |  |
| Viscosity modifier | (11) Fatty acid amide wax |  |  |  |  |  |
| Polyvinyl butyral resin/total resin content |  | 85.7% | 98.8% | 98.6% | 95.2% | 95.2% |
| Stringiness-imparting resin/total resin content |  | 4.8% | 1.2% | 1.4% | 4.8% | 4.8% |
| Content of aromatic alcohol: A, content of glycol ether: B A/B |  | 3.2 | 0.0 | 0.0 | 3.5 | 3.1 |
| Ink viscosity (mPas · s) at 20° C. and shear rate of 5 sec$^{-1}$ (2.5 rpm) |  | 30000 | 9000 | 33000 | 23000 | 23000 |
| Evaluation | Ink dripping test | A | B | A | B | A |
|  | Test of ink over time | A | B | B | B | A |
|  | Feeling of writing | B | A | B | A | B |
|  | Dry up performance test | A | B | A | B | B |

TABLE 8

|  |  | Example 312 | Example 313 | Example 314 | Example 315 | Example 316 |
|---|---|---|---|---|---|---|
| Salt-forming dye of azo skeleton acid dye and triarylmethane skeleton basic dye | (1) Salt-forming dye of diazo skeleton acid dye and Basic Violet4 (diazo skeleton acid dye + triarylmethane skeleton basic dye) |  | 18.0 | 18.0 | 15.0 |  |
|  | (1) Salt-forming dye of Acid Yellow36 and Basic Violet1 (monoazo skeleton acid dye + triarylmethane skeleton basic dye) |  |  |  |  | 18.0 |
|  | (1) Salt-forming dye of Acid Yellow36 and Basic Violet4 (monoazo skeleton acid dye + triarylmethane skeleton basic dye) | 20.0 |  |  |  |  |
|  | (2) Salt-forming dye of organic acid and basic dye (alkylbenzene sulfonic acid + basic dye) |  |  |  | 5.0 | 5.0 |

TABLE 8-continued

|  |  | Example | | | | |
|---|---|---|---|---|---|---|
|  |  | Example 312 | Example 313 | Example 314 | Example 315 | Example 316 |
| Butyral resin | (3) Polyvinyl butyral resin (hydroxyl group content: 34 mol %, mean degree of polymerization 1700) |  | 10.0 | 10.0 | 10.0 | 9.0 |
|  | (4) Polyvinyl butyral resin (hydroxyl group content: 36 mol %, mean degree of polymerization 300) | 16.5 |  |  |  |  |
|  | (5) Polyvinyl butyral resin (hydroxyl group content: 30 mol %, mean degree of polymerization 1300) |  |  |  |  |  |
| Ketone resin | (6) Ketone resin |  |  |  |  |  |
| Aromatic alcohol | Benzyl alcohol | 49.0 | 33.5 | 60.0 | 51.0 | 49.0 |
| Glycol ether | Ethylene glycol monophenyl ether | 12.2 | 36.0 | 9.5 | 16.5 | 16.5 |
| Surfactant | (7) Phosphate ester-based surfactant | 1.0 | 1.0 | 1.0 | 1.0 |  |
|  | (8) Phosphate ester-based surfactant |  |  |  |  | 1.0 |
| Organic amine | (9) Oxyethylene alkylamine | 1.0 | 1.0 | 1.0 | 1.0 | 1.0 |
| Stringiness-imparting agent | (10) Polyvinylpyrrolidone K90 | 0.3 | 0.5 | 0.5 | 0.5 | 0.5 |
| Stabilizer | Oleic acid |  |  |  |  |  |
| Viscosity modifier | (11) Fatty acid amide wax |  |  |  |  |  |
| Polyvinyl butyral resin/total resin content |  | 98.2% | 95.2% | 95.2% | 95.2% | 94.7% |
| Stringiness-imparting resin/total resin content |  | 1.8% | 4.8% | 4.8% | 4.8% | 5.3% |
| Content of aromatic alcohol: A, content of glycol ether: B A/B |  | 4.0 | 0.9 | 6.3 | 3.1 | 3.0 |
| Ink viscosity (mPa · s) at 20° C. and shear rate of 5 sec$^{-1}$ (2.5 rpm) |  | 14500 | 23000 | 23000 | 24000 | 27000 |
| Evaluation | Ink dripping test | B | B | A | A | A |
|  | Test of ink over time | A | B | A | A | A |
|  | Feeling of writing | A | A | A | A | A |
|  | Dry up performance test | A | A | B | A | A |

Comparative Examples 301 to 307

Oil-based ball-point pen ink compositions and oil-based ball-point pen refills were obtained in the same procedure as in Example 101 except that the ink formulation was changed, as shown in Table 9. Tests and evaluations were conducted in the same manner as in Example 301. The measurement and evaluation results are shown in Table 9. As is clear from Table 9, in Comparative Examples 301 to 303, a feeling of writing is heavy, and ink dripping was unfavorable, compared to Example 301, because no polyvinyl butyral resin was used. Further, in Comparative Examples 3040 and 305, the polyvinyl butyral resin and the salt-forming dye of the azo skeleton acid dye and the triarylmethane skeleton basic dye were not stably dissolved but were separated because no aromatic alcohol solvent was used. Further, in Comparative Examples 306 and 307, the polyvinyl butyral resin and the salt-forming dye of the azo skeleton acid dye and the triarylmethane skeleton basic dye were not stably dissolved but were separated because a salt-forming dye of an azo skeleton acid dye and a triarylmethane skeleton basic dye was not used.

TABLE 9

|  |  | Comparative Example | | | | | | |
|---|---|---|---|---|---|---|---|---|
|  |  | Comparative Example 301 | Comparative Example 302 | Comparative Example 303 | Comparative Example 304 | Comparative Example 305 | Comparative Example 306 | Comparative Example 307 |
| Salt-forming dye of azo skeleton acid dye and triarylmethane skeleton basic dye | (1) Salt-forming dye of diazo skeleton acid dye and Basic Violet4 (diazo skeleton acid dye + triarylmethane skeleton basic dye) | 18.0 | 18.0 | 10.0 | 18.0 | 18.0 |  |  |
|  | (2) Salt-forming dye of Acid Yellow42 and organic amine (Salt-forming dye of diazo skeleton acid dye + organic amine) |  |  |  |  |  | 18.0 |  |
|  | (2) Salt-forming dye of Acid Black 52 and organic amine (salt-forming dye of monoazo skeleton acid dye + organic amine) |  |  |  |  |  |  | 18.0 |
| Butyral resin | (3) Polyvinyl butyral resin (hydroxyl group content: 34 mol %, mean degree of polymerization 1700) |  |  |  | 10.0 | 10.0 | 10.0 | 15.0 |
|  | (3) Polyvinyl butyral resin (hydroxyl group content: 36 mol %, mean degree of polymerization 300) |  |  |  |  |  |  |  |
| Ketone resin | (6) Ketone resin | 45.0 | 30.0 | 35.0 |  |  |  |  |
| Aromatic alcohol | Benzyl alcohol | 26.5 | 39.5 | 34.5 |  |  | 54.5 | 48.0 |

TABLE 9-continued

|  |  | Comparative Example | | | | | | |
|---|---|---|---|---|---|---|---|---|
|  |  | Comparative Example 301 | Comparative Example 302 | Comparative Example 303 | Comparative Example 304 | Comparative Example 305 | Comparative Example 306 | Comparative Example 307 |
| Aliphatic alcohol | Isopropyl alcohol |  |  |  | 53.0 |  |  |  |
| Glycol ether | Ethylene glycol monophenyl ether | 8.0 | 10.0 | 17.0 | 16.5 | 69.5 | 15.0 | 16.5 |
| Surfactant | (7) Phosphate ester-based surfactant | 1.0 | 1.0 | 1.0 | 1.0 | 1.0 | 1.0 | 1.0 |
|  | (8) Phosphate ester-based surfactant |  |  |  |  |  |  |  |
| Organic amine | (9) Oxyethylene alkylamine | 1.0 | 1.0 |  | 1.0 | 1.0 | 1.0 | 1.0 |
| Stringiness-imparting agent | (10) Polyvinylpyrrolidone K90 | 0.5 | 0.5 | 0.5 | 0.5 | 0.5 | 0.5 | 0.5 |
| Stabilizer | Oleic acid |  |  |  |  |  |  |  |
| Viscosity modifier | (11) Fatty acid amide wax |  |  | 2.0 |  |  |  |  |
| Polyvinyl butyral resin/total resin content |  | 0.0% | 0.0% | 0.0% | 95.2% | 95.2% | 95.2% | 96.8% |
| Stringiness-imparting resin/total resin content |  | 1.1% | 1.6% | 1.4% | 4.8% | 4.8% | 4.8% | 3.2% |
| Content of aromatic alcohol: A, content of glycol ether: B A/B |  | 3.3 | 4.0 | 2.0 | 3.2 | 0.0 | 3.6 | 2.9 |
| Ink viscosity (mPa · s) at 20° C. and shear rate of 5 sec$^{-1}$ (2.5 rpm) |  | 35000 | 23000 | 20000 | * | * | * | * |
| Evaluation | Ink dripping test | D | D | D | * | * | * | * |
|  | Test of ink over time | A | A | A | D | D | D | D |
|  | Feeling of writing | D | D | D | * | * | * | * |
|  | Dry up performance test | C | C | C | * | * | * | * |

* Unevaluable

Reference Example 301

Without shown in the tables, in the ball-point pen of each of Examples and Comparative Examples, when ink moved in the ink housing cylinder with consuming the ink in the case of conducting a writing test, the ink did not adhere to the inner wall of the ink housing cylinder because silicone was applied to the inner wall of the ink housing cylinder (made of polypropylene), and therefore, the residual amount of ink was able to be clearly confirmed. In contrast, in the case of conducting a writing test for a ball-point pen in which silicone was not applied to the inner wall of an ink housing cylinder (made of polypropylene), using the oil-based ball-point pen ink composition of Example 301, as Reference Example 301, ink adhered to the inner wall of the ink housing cylinder, thereby preventing the residual amount of ink from being recognized.

Further, in the case of using a retractable oil-based ball-point pen such as a knock-type oil-based ball-point pen or a rotation delivery-type oil-based ball-point pen, performance against ink dripping is one of the most important performances, and therefore, use of an oil-based ball-point pen refill in which the performance against ink dripping can be allowed to be favorable by forming a resin coating film on a leading tip end to cover a gap between a ball and the leading tip end, as in the case of the present invention, is effective.

Further, in each of the present examples, the oil-based ball-point pen housing the oil-based ball-point pen refill in which the oil-based ball-point pen ink composition is housed directly in the barrel cylinder is exemplified for convenience. However, the oil-based ball-point pen of the present invention may also be a direct-housing-type oil-based ball-point pen in which an ink housing cylinder is a barrel cylinder and an oil-based ball-point pen ink composition is housed directly in the barrel cylinder. Further, in each of the present examples, the ball-point pen tip in which a wire rod is formed by cutting is exemplified for convenience. However, a ball-point pen tip in which a pipe material is formed by press working is also acceptable.

REFERENCE SIGNS LIST

1 Ball-point pen refill
2 Ink housing cylinder
3 Ball
4 Ball-point pen tip
5 Leading tip end
6 Ball holding chamber
7 Ink circulation hole
8 Ink circulation groove
9 Ball seat
10 Oil-based ball-point pen ink
H Ball protrusion
α Crimping angle

The invention claimed is:

1. An oil-based ball-point pen refill, comprising a ball-point pen tip in which a ball is rotatably held wherein an axial moving amount of the ball is 5 to 20 μm, wherein the ball-point pen tip is mounted directly or via a tip holder on a leading end of an ink housing cylinder, an oil-based ball-point pen ink composition comprising a coloring agent, an organic solvent, and resin is housed in the ink housing cylinder, an arithmetic mean roughness of a surface of the ball is 0.1 to 15 nm, the coloring agent consists of a dye, the oil-based ball-point pen ink composition comprises polyvinyl butyral resin as the resin, a content of the polyvinyl butyral resin is 50 mass % or more based on a total mass of the whole resin in the oil-based ball-point pen ink composition, and an ink viscosity at 20° C. and a shear rate of 5 sec$^{-1}$ is 5000 to 50000 mPa·s.

2. The oil-based ball-point pen refill according to claim 1, wherein an amount of consumed ink per 100 m is 30 to 80 mg.

3. The oil-based ball-point pen refill according to claim 1, wherein a mean degree of polymerization of the polyvinyl butyral resin is 200 to 2500.

4. The oil-based ball-point pen refill according to claim 1, wherein a hydroxyl group content of the polyvinyl butyral resin is 25 mol % or more.

5. The oil-based ball-point pen refill according to claim 1, wherein the oil-based ball-point pen ink composition comprises: a salt-forming dye of an azo skeleton acid dye and a triarylmethane skeleton basic dye as the dye; and an aromatic alcohol-based solvent as the organic solvent.

6. The oil-based ball-point pen refill according to claim 1, wherein the oil-based ball-point pen ink composition further comprises a phosphate ester-based surfactant.

7. An oil-based ball-point pen, wherein the oil-based ball-point pen refill according to claim 1 is disposed in a barrel cylinder.

8. An oil-based ball-point pen which is a retractable oil-based ball-point pen, wherein the oil-based ball-point pen refill according to claim 1 is slidably disposed in a barrel cylinder, and a leading tip end of the ball-point pen tip is retractable from a leading end of the barrel cylinder.

* * * * *